(12) United States Patent
Brandow et al.

(10) Patent No.: US 6,938,041 B1
(45) Date of Patent: Aug. 30, 2005

(54) JAVA-BASED DATA ACCESS OBJECT

(75) Inventors: David John Brandow, Guelph (CA);
John Murray Childs, Waterloo (CA);
Robert Donald Close, Guelph (CA); J. Y. Eric Giguere, Waterloo (CA); Geno Coschi, Waterloo (CA)

(73) Assignee: Sybase, Inc., Dublin, CA (US)

( * ) Notice: Subject to any disclaimer, the term of this patent is extended or adjusted under 35 U.S.C. 154(b) by 634 days.

(21) Appl. No.: 09/562,641

(22) Filed: May 1, 2000

Related U.S. Application Data

(60) Provisional application No. 60/131,929, filed on Apr. 30, 1999.

(51) Int. Cl.[7] ............................................... G06F 7/00
(52) U.S. Cl. ......................... 707/10; 707/102; 707/103
(58) Field of Search .......................... 707/102, 10, 103

(56) References Cited

U.S. PATENT DOCUMENTS

| | | | |
|---|---|---|---|
| 5,121,477 A | | 6/1992 | Koopmans et al. |
| 5,148,154 A | | 9/1992 | MacKay et al. |
| 5,179,652 A | | 1/1993 | Rozmanith et al. |
| 5,204,947 A | | 4/1993 | Bernstein et al. |
| 5,293,615 A | | 3/1994 | Amada |
| 5,367,619 A | | 11/1994 | Dipaolo et al. |
| 5,396,587 A | | 3/1995 | Reed et al. |
| 5,410,704 A | | 4/1995 | Norden-Paul et al. |
| 5,566,330 A | | 10/1996 | Sheffield |
| 5,594,899 A | | 1/1997 | Knudsen et al. |
| 5,682,535 A | | 10/1997 | Knudsen |
| 5,884,312 A | * | 3/1999 | Dustan et al. ................. 707/10 |
| 6,012,067 A | * | 1/2000 | Sarkar ............................ 703/3 |
| 6,094,655 A | * | 7/2000 | Rogers et al. ................. 707/10 |
| 6,185,567 B1 | * | 2/2001 | Ratnaraj et al. .............. 705/26 |
| 6,249,291 B1 | | 6/2001 | Popp et al. |

\* cited by examiner

*Primary Examiner*—Greta Robinson
*Assistant Examiner*—S R Pannala
(74) *Attorney, Agent, or Firm*—John A. Smart; G. Mack Riddle

(57) ABSTRACT

A Database Development System is described that provides methodologies for creating a Java-based database control object (the "Java DataWindow") for use in a Client/Server Database System. The methodology provided by the present invention maintains the DataWindow properties (e.g., SQL statement for data to retrieve, format specifications, and the like) at a server-side DataWindow component residing at an application server. A corresponding client-side DataWindow component, embedded for instance in a target HTML page, knows how to query the server-side DataWindow component for dynamically streaming the DataWindow's properties, so that they may be applied at run-time on the client side. After an end user has entered in the input desired, the changes are determined by the client-side DataWindow component and flushed back to the server-side DataWindow component at the application server. The server-side DataWindow component, in turn, can effect the changes to the back end database, as appropriate.

34 Claims, 25 Drawing Sheets

```
//
// First, loop through each row of the dw_orddetail DW
// control and delete each one from the primary buffer.
//
integer li_counter
long ll_detailrows // Determine how many item rows are currently in
    // dw_orddetail.

ll_detailrows = dw_orddetail.RowCount ()     → FUNCTION CALL

// Now loop through them.

FOR li_counter = 1 TO ll_detailrows

// Delete the current item row.

dw_orddetail.DeleteRow (0)               → FUNCTION CALL

NEXT

...
```

COMMENTS ↑
VARIABLE DECLARATIONS ↑
POWERSCRIPT STATEMENTS ↑

FIG. 11B

```
// This script uses embedded SQL to find the highest Cust_Id
// currently stored in the database.  It then adds 1 to that
// number to provide the Id for a new customer.

integer li_fetched_id = 0

SELECT Max("customer"."cust_id" )
    INTO :li_fetched_id
    FROM "customer"
    USING sqlca;

IF sqlca.sqlcode >= 0 THEN

IF IsNull(li_fetched_id) THEN
    li_fetched_id = 0
END IF li_fetched_id ++

ELSE li_fetched_id = -1

END IF

...
```

EMBEDDED SQL STATEMENT

POWERSCRIPT STATEMENTS

*FIG. 11C*

```
// This function uses embedded SQL to see if the customer to
// be deleted has any orders in the database.  It takes one
// argument -- the customer's ID number.
//
//      Return values:
//      * If no orders, then 0
//      * If orders, then that number
//      * If error, then -1 integer li_fetched_count = 0

SELECT Count("order_header"."order_id")
    INTO :li_fetched_count
    FROM "order_header"
    WHERE "order_cust_id" = :ai_custid
    USING sqlca;

IF sqlca.sqlcode = -1 THEN li_fetched_count = -1

RETURN li_fetched_count
```

FIG. 11D

JAVA-BASED DATA ACCESS OBJECT

RELATED APPLICATIONS

The present application is related to and claims the benefit of priority from commonly-owned provisional application serial no. 60/131,929, entitled JAVA-BASED DATA ACCESS OBJECT, filed Apr. 30, 1999, the disclosure of which is hereby incorporated by reference. The present application is also related to commonly-owned application Ser. No. 09/527,983, now U.S. Pat. No. 6,714,928 filed Mar. 17, 2000, the disclosure of which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to development and execution of database application programs which operate in a Web environment, particularly in the context of Java applets embedded within HTML pages that are displayed at an end user's browser.

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee. Here, each record contains fields designating specifics about the employee, such as name, home address, salary, and the like.

Between the actual physical database itself (i.e., the records contained in data pages stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level. The general construction and operation of a database management system is known in the art. See e.g., Date, C., *An Introduction to Database Systems*, Volume I and II, Addison Wesley, 1990; the disclosure of which is hereby incorporated by reference.

DBMS systems have long since moved from a centralized mainframe environment to a de-centralized or distributed environment. One or more PC "client" systems, for instance, may be connected via a network to one or more server-based database systems (SQL database server). Commercial examples of these "client/server" systems include Powersoft™ clients connected to one or more Sybase SQL Server™ database servers. Both Powersoft™ and Sybase SQL Server™ are available from Sybase, Inc. of Emeryville, Calif. As the migration to client/server continues, each day more and more businesses are run from mission-critical systems which store information on server-based SQL database systems, such as Sybase SQL Server™. As a result, increasingly higher demands are being placed on server-based SQL database systems to provide enterprise-wide decision support—providing timely on-line access to critical business information (e.g., through "queries"). Accordingly, there is much interest in improving the performance of such systems, particularly in the area of database query performance.

In existing PC-based client/server application environments there are situations in which many, perhaps hundreds, of users having widely variant levels of database expertise execute sophisticated database queries frequently and regularly on a single, powerful relational database management system (RDBMS). One example of such a situation is one in which a database is used to track information regarding a company's employees. Such a database is relied upon and used many times a day by management staff, accounting staff, and personnel staff for various purposes. Since the people actually using the database are not necessarily fluent in database languages or procedures, it is necessary to have an effective, i.e., easy to use, and efficient interface between the user and the database itself.

Typically, the interface between the user and the database is programmed in advance by a database programmer using an application development package having various database "tools", which range in sophistication from a programming language, e.g., the C programming language, to so-called "application builders" which provide software routines to automate some tasks, e.g., window managers to control data presentation effects such as "pop-up" windows, menu bars, and "pull down" menus. Such an interface typically employs graphics, color, and animation, all of which are CPU-intensive functions executed by the front-end desktop computer.

With the ever-increasing movement of computing to the Internet, there is great interest in extending database development tools to leverage the connectivity provided by the Internet. More particularly, developer users are particularly interested in tools that allow application software, including database application programs, to be "hosted" by the user's own browser.

SUMMARY OF THE INVENTION

A Database Development System is described that provides methodologies for creating an HTML database control object for use in a Client/Server Database System The system includes one or more Clients (e.g., Terminals or PCs) connected via a Network to a Server. In general operation, Clients store data in and retrieve data from one or more database tables resident on the Server by submitting SQL commands, some of which specify "queries"—criteria for selecting particular records of a table. The system includes a "DataWindow"(previously patented and described in commonly-owned U.S. Pat. No. 5,566,330) that provides a unique type of component or object used to retrieve, display, and manipulate data from a relational database or other data source. DataWindow objects have knowledge about the data they are retrieving, and present information according to user-specified display formats, presentation styles, validation rules, expressions and other data properties, so dynamic data is used in the most meaningful way.

In accordance with the present invention, the DataWindow is adapted for providing a java-based data access object—a Java DataWindow—that includes both client-side and server-side components. The approach adopted by the present invention is to maintain the DataWindow properties at a server-side DataWindow component residing at an application server. A corresponding client-side DataWindow component, embedded for instance in a target HTML page, knows how to query the server-side DataWindow component for dynamically streaming the DataWindow's properties, so that they may be applied at run-time on the client side. After an end user has entered in the input desired, the changes are determined by the client-side DataWindow component and flushed back to the server-side DataWindow component at the application server. The server-side DataWindow component, in turn, can effect the changes to the back end database, as appropriate.

During run-time operation, the following method steps execute. First, the client-side Java DataWindow is invoked at the client side application (e.g., Java applet). This may occur, for example, upon an end user displaying an HTML page having a Java applet in which the Java DataWindow is embedded. The client-side Java DataWindow begins operation by invoking the corresponding server-side DataWindow component via a GetFullState API call. In response to this call, the DataWindow definition is converted into a binary stream by the server-side DataWindow component at the application server and is then sent to (i.e., streamed to) the client. Upon receiving the DataWindow definition, the client-side Java DataWindow invokes a SetFullState API call (on itself), for applying the DataWindow definition to itself. This includes invocation of the SQL statement and format specification, whereupon the database information of interest is display at the Java DataWindow in the desired format (e.g., tabular grid).

After these properties are applied at the client, the Java DataWindow is ready to (optionally) receive end user input. Typical end user input includes inserting, deleting, and/or modifying information that is displayed at the DataWindow. In the event that the end user has provided input, the end user signals completion of input (or otherwise terminates display of the client-side DataWindow component), such as by selecting an "Okay" screen button. This action triggers another API call, GetChanges. The purpose of the GetChanges API call is to submit to those user-provided changes to the application server which, in turn, will "commit" those changes (to the back end database). In operation, the GetChanges API call determines internally what has been changed by the end user, since the data was last retrieved. To facilitate this process, the Java DataWindow keeps its own state. Therefore, when GetChanges is invoked, the Java DataWindow generates a stream describing what has changed, in a format suitable for transmission to the application server. Now, the client-side Java DataWindow may invoke SetChanges on the server DataWindow component at the application server. This action leads to application of those changes to the server-side DataWindow component. Finally, the server-side DataWindow component may, in a corresponding manner, proceed to apply those changes to the back end database and/or optionally execute other middle-tier business logic.

BRIEF DESCRIPTION OF THE DRAWINGS

FIGS. 11B–C are diagrams illustrating scripts which include comments, variable declarations, executable statements, and embedded SQL statements.

FIG. 11D is a diagram illustrating a script function employing embedded SQL.

DETAILED DESCRIPTION OF A PREFERRED EMBODIMENT

The following description will focus on the presently-preferred embodiment of the present invention, which is operative in a network environment executing client/server database applications. The present invention, however, is not limited to any particular application or environment. Instead, those skilled in the art will find that the present invention may be advantageously applied to any of those application or environment where browser-based rendering of information is desirable, including information from non-SQL database management systems and the like. The description of the exemplary embodiments which follows is, therefore, for the purpose of illustration and not limitation.

Standalone System Hardware

Figure 1A:
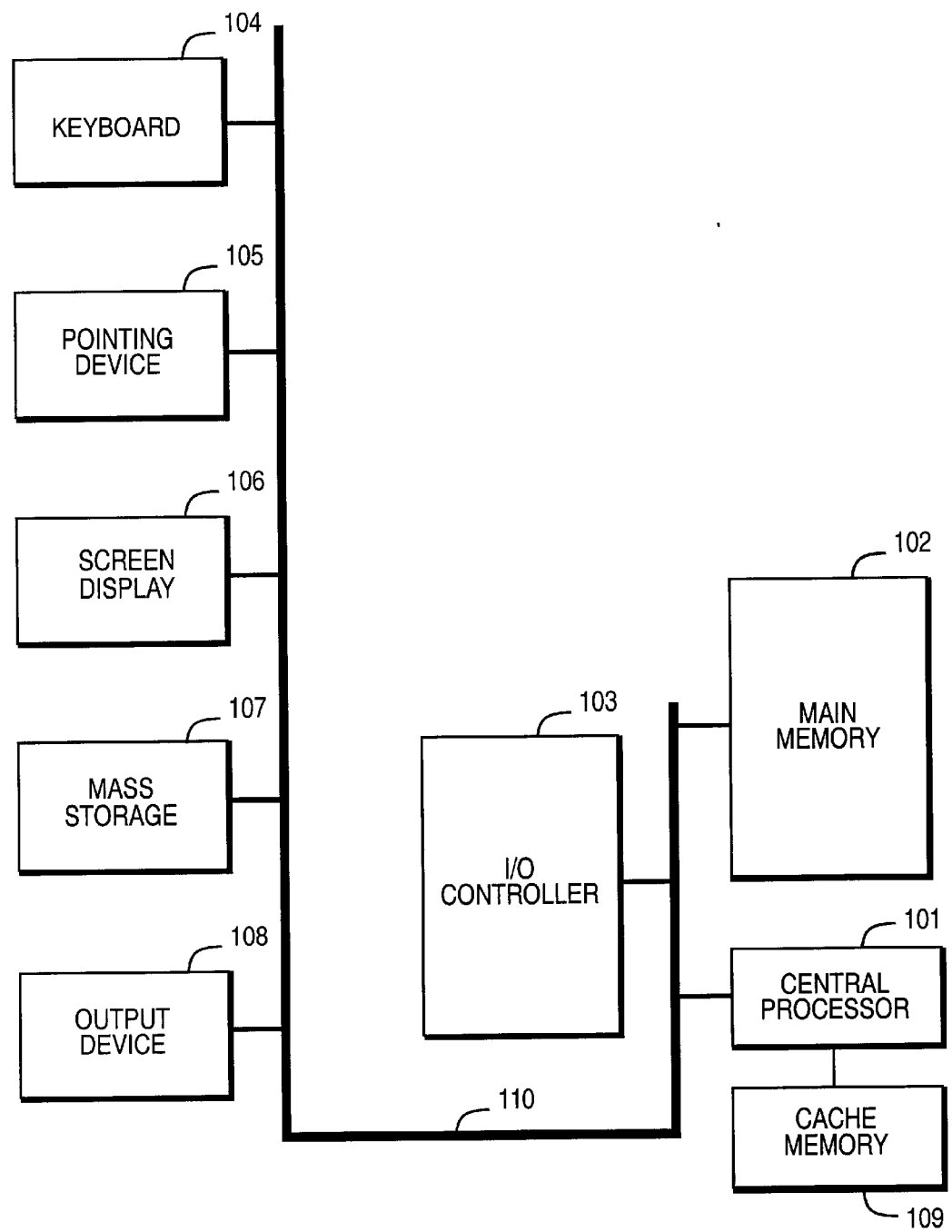
FIG. 1A is a block diagram of a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a mass storage 107 (e.g., hard or fixed disk, removable disk, optical disk, magneto-optical disk, or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

Standalone System Software

Figure 1B:
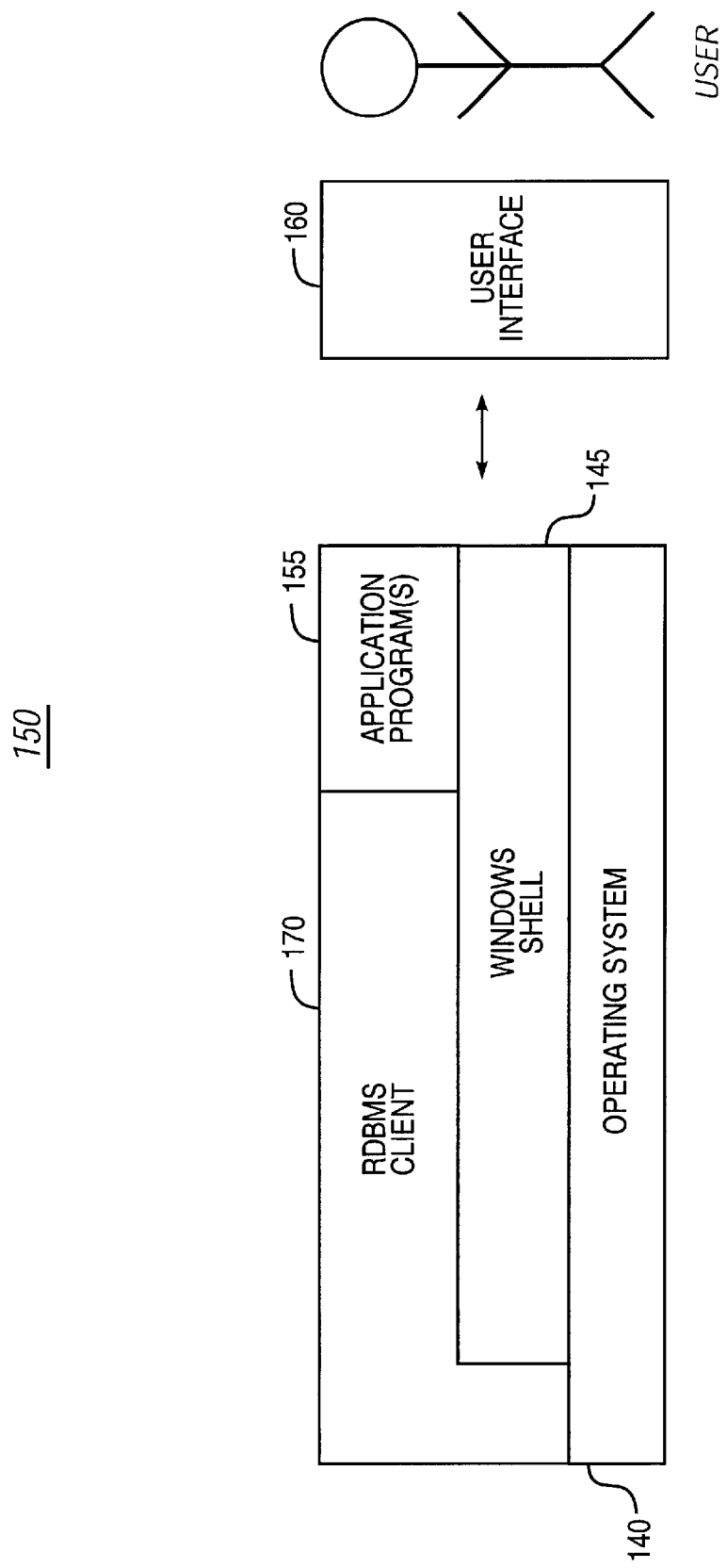
FIG. 1B is a block diagram of a software subsystem for controlling the operation of the computer system of FIG. 1A.

Illustrated in FIG. 1B, a computer software system 150 is provided for directing the operation of the computer system 100. Software system 150, which is stored in system memory 102 and on mass storage or disk memory 107, includes a kernel or operating system (OS) 140 and a windows shell 145. One or more application programs, such as application software programs 155, may be "loaded" (i.e., transferred from storage 107 into memory 102) for execution by the system 100. The system also includes a user interface 160 for receiving user commands and data as input and displaying result data as output.

Also shown, the software system 150 includes a Relational Database Management System (RDBMS) front-end or "client" 170, which includes database development environment and tools. The RDBMS client 170 comprises a database front-end development environments, such as Sybase PowerBuilder™ (the preferred embodiment). In an exemplary embodiment, the front-end will include SQL access drivers (e.g., Borland SQL Links, Microsoft ODBC drivers, Intersolv ODBC drivers, and the like) for accessing database tables from an SQL database server operating in a Client/Server environment. In the most-preferred embodiment, RDBMS client/development environment comprises PowerBuilder Enterprise for Windows, available from Sybase, Inc. of Emeryville, Calif. Description of PowerBuilder can be found in the manuals accompanying PowerBuilder Enterprise, including *Application Techniques, DataWindow Programmer's Guide, DataWindow Reference, PowerScript Reference, User's Guide,* and *Using the PowerBuilder Internet Tools*, which are available from Sybase, Inc. (and also currently available online at http://sybooks.sybase.com). Additional description can be found in application Ser. No. 08/393,049, filed Feb. 23, 1995, now U.S. Pat. No. 5,566,330. The disclosures of each of the foregoing are hereby incorporated by reference.

Client/Server Environment

A. General

Figure 2:
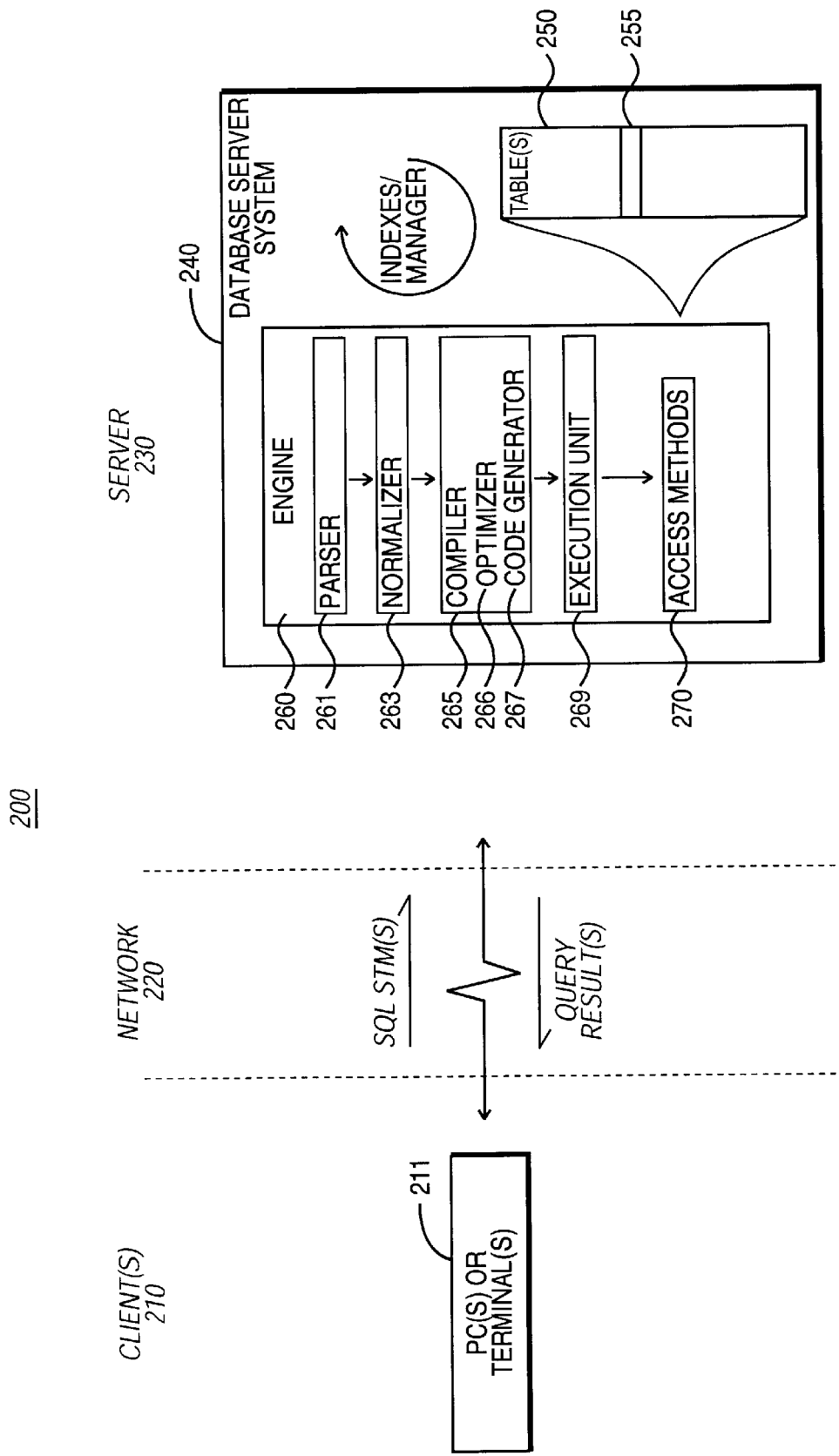
FIG. 2 is a block diagram of a client/server system in which the present invention is preferably embodied.

While the present invention may operate within a single (standalone) computer (e.g., system 100 of FIG. 1A), the present invention is preferably embodied in a multi-user computer system, such as a Client/Server environment. FIG. 2 illustrates the general structure of a Client/Server Database System 200 suitable for implementing the present invention (e.g., for deploying a database control object created in accordance with the teachings of the present invention). As shown, the system 200 comprises one or more Client(s) 210 connected to a Server 230 via a Network 220. Specifically, the Client(s) 210 comprise one or more standalone Terminals 211 connected to a Database Server System 240 using a conventional network. In an exemplary embodiment, the Terminals 211 may themselves comprise a plurality of standalone workstations, dumb terminals, or the like, or comprise personal computers (PCs) such as the above-described system 100. Typically, such units would operate under a client operating system, such as Microsoft Windows/MS-DOS for PC clients.

The Database Server System 240, which comprises Sybase Adaptive Server™ (formerly Sybase SQL Server™) available from Sybase, Inc. in an exemplary embodiment, generally operates as an independent process (i.e., independently of the Clients), running under a server operating system such as Microsoft Windows NT/2000 (Microsoft Corp. of Redmond, Wash.), NetWare (Novell of Provo, Utah), UNIX (Novell), or OS/2 (IBM). The Network 220 may be any one of a number of conventional network systems, including a Local Area Network (LAN) or Wide Area Network (WAN), as is known in the art (e.g., using Ethernet, IBM Token Ring, or the like). The Network includes functionality for packaging client calls in the well-known SQL (Structured Query Language) together with any parameter information into a format (of one or more packets) suitable for transmission across a cable or wire, for delivery to the Database Server System 240.

Client/server environments, database servers, and networks are well documented in the technical, trade, and patent literature. For a discussion of database servers and client/server environments generally, and SQL Server™ particularly, see, e.g., Nath, A., *The Guide to SQL Server*, Second Edition, Addison-Wesley Publishing Company, 1995. Additional documentation of SQL Server™ is available from Sybase, Inc. as *SQL Server Documentation Set* (Catalog No. 49600). For a general introduction to a Local Area Network operating under NetWare, see Freed, L. et al., *PC Magazine Guide to Using NetWare*, Ziff-Davis Press, 1991. A more detailed discussion is available in NetWare 3.x and 4.x and accompanying documentation, which is available from Novell of Provo, UT. The disclosures of each of the foregoing are hereby incorporated by reference.

In operation, the Client(s) 210 store data in or retrieve data from one or more database tables 250, shown in FIG. 2. Typically resident on the Server 230, each table itself comprises one or more horizontal rows or "records" (tuples) together with vertical columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the Client(s) issue one or more SQL commands to the Server. SQL commands may specify, for instance, a query for retrieving particular data (i.e., data records meeting the query condition) from the table 250. The syntax of SQL (Structured Query Language) is well documented; see, e.g., the above-mentioned *An Introduction to Database Systems*. In addition to retrieving the data from Database Server tables, the Client(s) also include the ability to insert new rows of data records into the table; Client(s) can also modify and/or delete existing records in the table.

For enhancing the speed in which the Database Server stores, retrieves, and presents particular data records, the Server maintains one or more database indexes on the table, under control of an Index Manager. A database index, typically maintained as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file. Alternatively, instead of storing unique record numbers, a "clustered" index may be employed. This is an index which stores the data pages of the records themselves on the terminal or leaf-level nodes of the index.

In operation, the SQL statements received from the one or more Clients 210 (via Network 220) are processed by Engine 260 of the Database Server System 240. The Engine 260 itself comprises a Parser 261, Normalizer 263, Compiler 265, Execution Unit 269, and Access Methods 270. Specifically, the SQL statements are passed to the Parser 261 which converts the statements into a query tree—a binary tree data structure which represents the components of the query in a format selected for the convenience of the system. In this regard, the Parser 261 employs conventional parsing methodology (e.g., recursive descent parsing).

The query tree is normalized by the Normalizer 263. Normalization includes, for example, the elimination of redundant data. Additionally, the Normalizer 263 performs error checking, such as confirming that table names and column names which appear in the query are valid (e.g., are available and belong together). Finally, the Normalizer can also look up any referential integrity constraints which exist and add those to the query.

After normalization, the query tree is passed to the Compiler 265, which includes an Optimizer 266 and a Code Generator 267. The Optimizer is responsible for optimizing the query tree. The Optimizer performs a cost-based analysis for formulating a query execution plan. The Optimizer will, for instance, select the join order of tables (e.g., when working with more than one table); it will select relevant indexes (e.g., when indexes are available). The Optimizer, therefore, performs an analysis of the query and picks the best execution plan, which in turn results in particular ones of the Access Methods 270 being invoked during query execution.

The Code Generator 267, on the other hand, converts the query tree into a set of instructions suitable for satisfying the query. These instructions are passed to the Execution Unit 269. Operating under the control of these instructions, the Execution Unit 269 generates calls into lower-level routines, such as the Access Methods 270, for retrieving relevant information (e.g., row 255) from the database table 250. The Access Methods operate in conjunction with multiple Buffer Managers to access the data (described in detail in commonly-owned application Ser. No. 08/554,126, filed Nov. 6, 1995, now U.S. Pat. No. 5,812,996, and hereby incorporated by reference), as required by the query plan. After the plan has been executed by the Execution Unit, the Server returns a query result or answer table back to the Client(s).

B. Designing an Application in an Integrated Development Environment

Before describing how to use a Java access object of the present invention in detail, it is first helpful to review the task of designing an application in the integrated development environment (i.e., PowerBuilder™) provided in the system of the present invention.

1. Requirements

One of the keys to successful application development (in PowerBuilder or any other development environment) is designing what a user is going to build before he/she begins building it. The way to start this design phase is to determine the detailed requirements that a user's application must meet to satisfy the needs of the ultimate end users.

Determining requirements entails figuring out, in real-world terms, what the application is to do when someone uses it. A user's goal should be to specify: A conceptual walk-through of the application, from the point when users start it to the point when they exit from it, and one or more perspectives of the application's composition, such as by flow, by components, by dependencies, or by usage.

To figure out the requirements of a typical client/server application, it is helpful to break them down into several different categories:

(1) Data access—Which database tables the application needs to use for its data input and output. Which basic database operations (create, retrieve, update, delete) the application needs to perform on these tables.

(2) User interface—How the application is to present this data to users. How users are to interact with the application to view the data, manipulate it, and navigate through the application's various displays.

(3) Processing—What the application is to do with the data to prepare it for display to the user or update to the database tables. What the flow of control is to be as the application performs its various operations.

(4) Program interaction—What data sharing (if any) the application needs to do with other programs. What additional services (if any) the application must get through the execution of other programs.

(5) Output—What reports the application needs to print and how it is to format them. What other materials (such as files) the application is to generate as a byproduct of its processing.

2. Sample Application

Consider an Order Entry application for a hypothetical company, Anchor Bay Nut Company. Referring back to the different categories of requirements above, representative requirements necessary for such an application include the following.

Figure 3A:
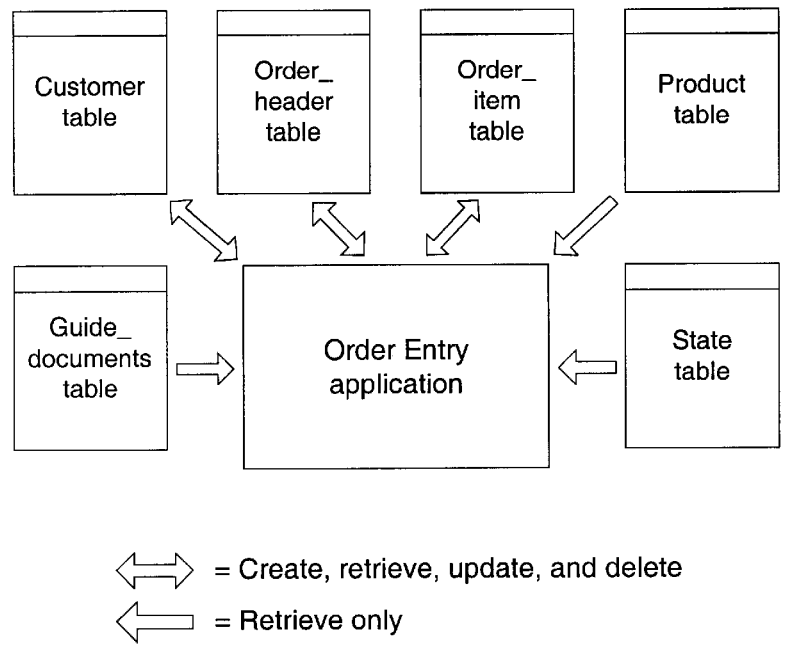
FIG. 3A is a block diagram illustrating data access in the system using a sample "order entry" application.
Figure 3B:
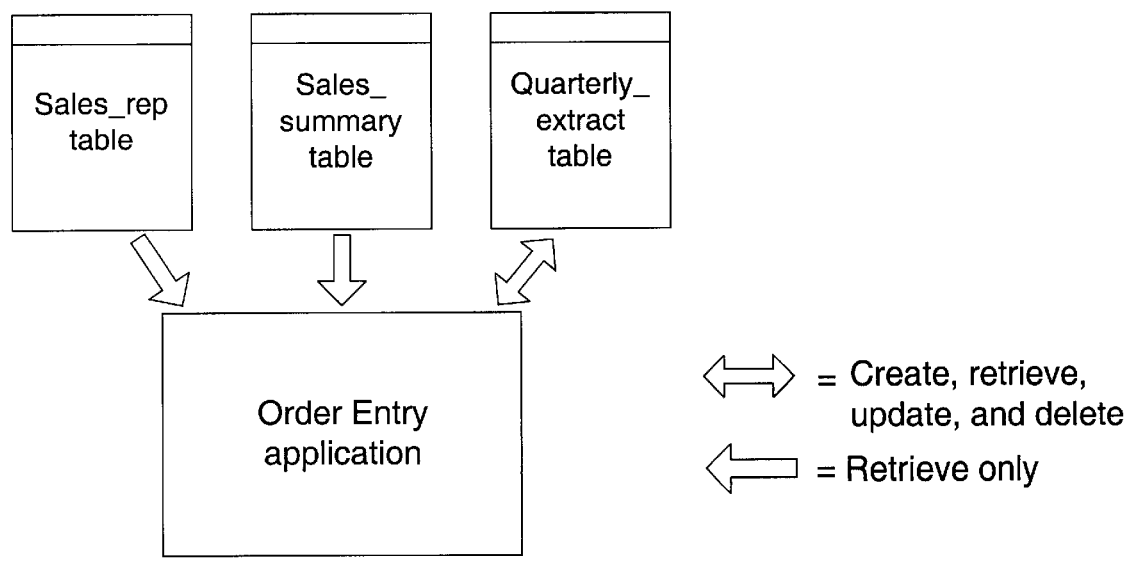
FIG. 3B is a block diagram illustrating data access to different database tables (e.g., residing on a server) for the order entry application.

(1) Data access—As illustrated in FIG. 3A, the Order Entry application needs to access the company's main database (e.g., ANCHRBAY.DB) from the server so that it can use these tables. As illustrated in FIG. 3B, the application also needs to access the company's sales database (e.g., ABNCSALE.DB) from the server so that it can use these tables.

(2) User interface—The Order Entry application needs to present major displays with which the user is to interact: One for viewing (retrieving) and maintaining (creating, updating, deleting) customer data in the Customer database table, and one for viewing and maintaining order data in the Order_header and Order_detail database tables. In the course of supporting these customer and order maintenance activities, the application must also present a number of more minor displays (such as for logging on to the databases, soliciting choices from the user, displaying messages, and more).

Figure 4A:
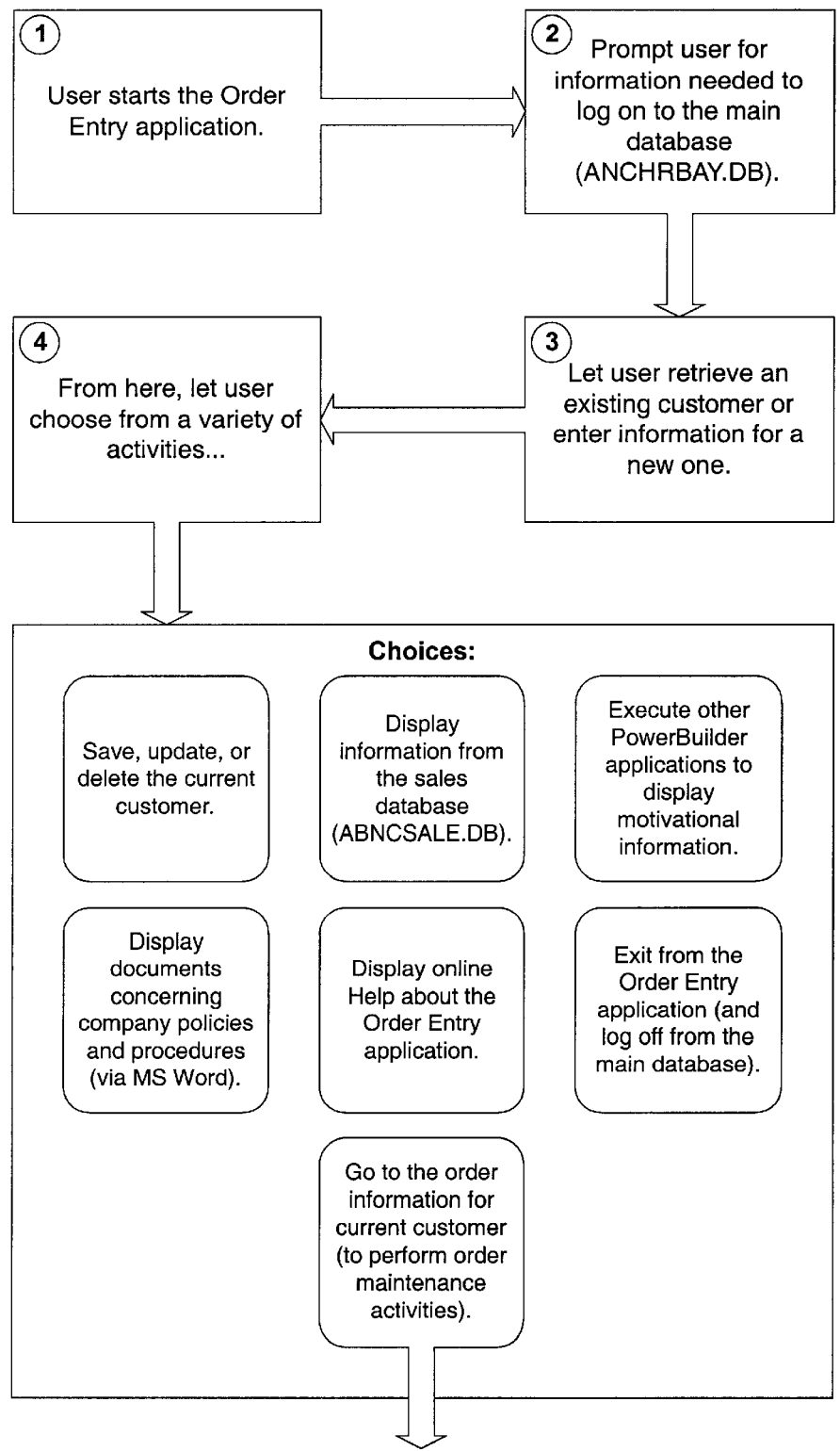
FIGS. 4A–B represent a flow diagram illustrating processing which occurs in the order entry application.
Figure 4B:
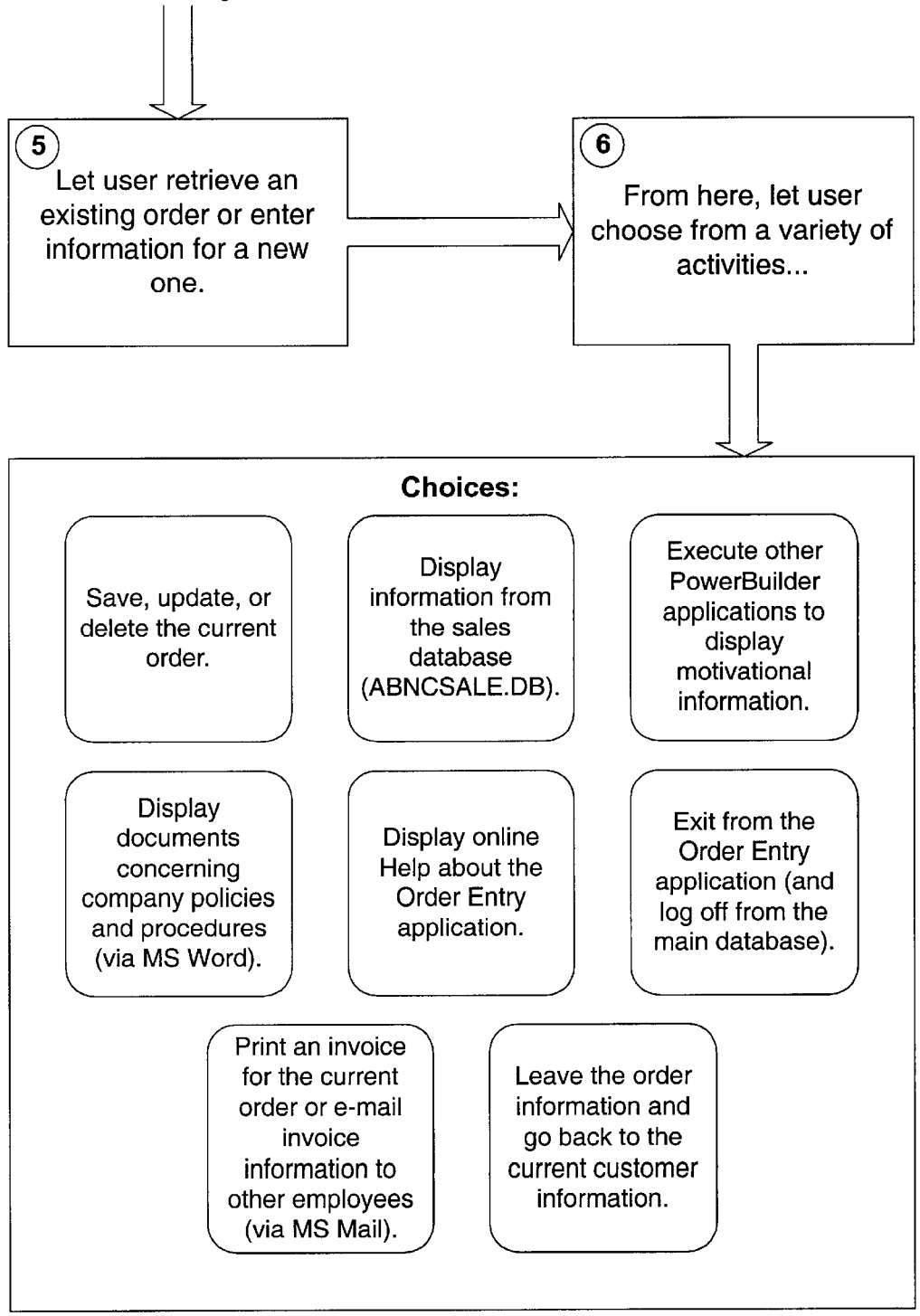

(3) Processing—FIGS. 4A–B represent the basic flow of processing that the user encounters when navigating through the sample Order Entry application (ignoring many of its supporting activities for the sake of simplicity).

(4) Program interaction—In support of its customer and order maintenance activities, the Order Entry application also needs to access some external programs, including: a text editor program (e.g., Microsoft Word) to let the user view documents concerning company policies and procedures; an electronic mail program (e.g., Microsoft Mail) to let the user send order invoices to other employees; and other existing applications (e.g., that were created with PowerBuilder) to display motivational information to the user.

Figure 4C:
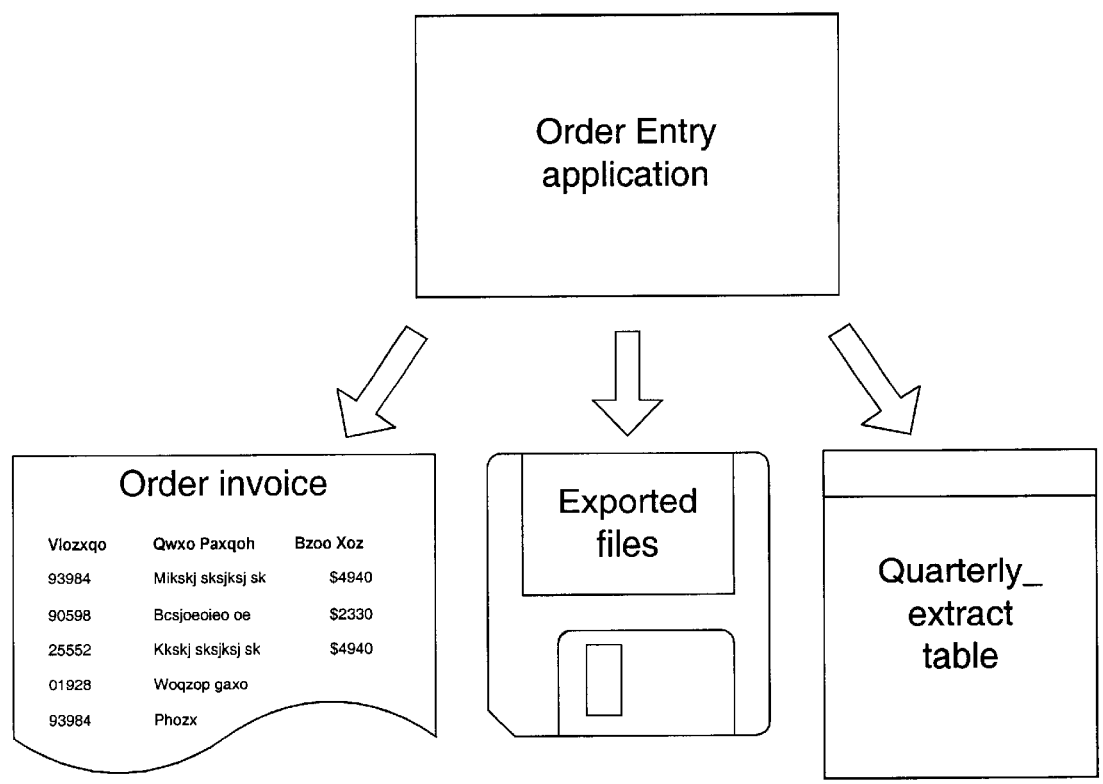
FIG. 4C is a block diagram illustrating various kinds of output which can be generated from the order entry application.

(5) Output—The Order Entry application should also produce various kinds of output when requested by the user. As illustrated in FIG. 4C, exemplary outputs includes printing an invoice for a particular order; exporting customer or order data to a file (using any one of several different file formats); and extracting quarterly data from the Sales_rep_ and Sales_summary tables of the sales database and storing that data in a new table (e.g., named Quarterly_extract).

Once a user developer (i.e., user other than the end user) knows the detailed requirements that his/her application must meet, a user then maps them to features that the development environment provides. This portion of the design phase includes specifying the accessing of data (e.g., by servers and other data sources); implementing the user interface (e.g., windows and controls); controlling the application's processing (e.g., events and scripts); extending the application's processing (e.g., external programs); and routing application output (e.g., reports, files, and "pipelines").

3. Accessing Data: Servers and Other Data Sources

Figure 5A:
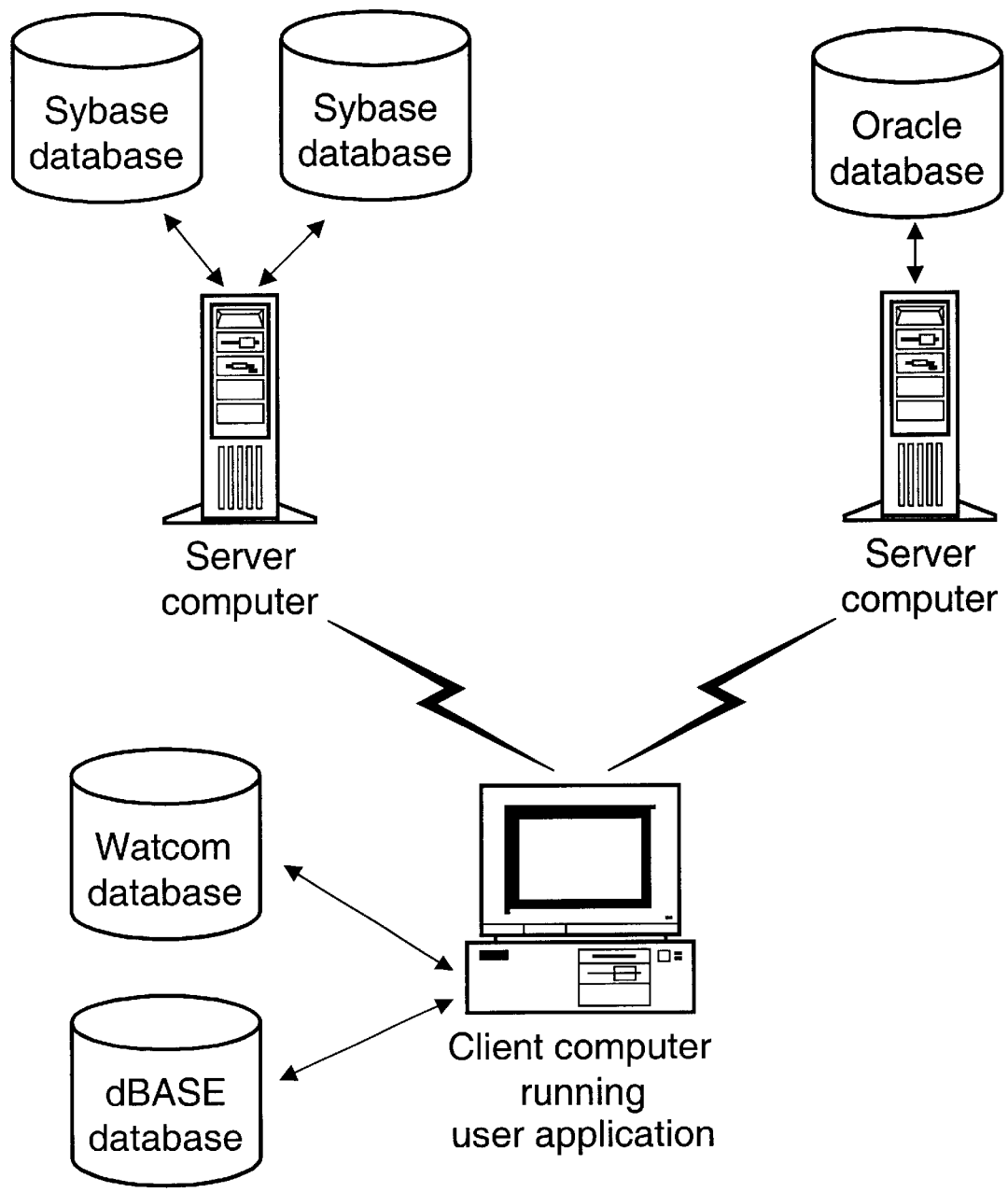
FIG. 5A is a block diagram illustrating that information in a client/server environment can be stored in different places (i.e., different servers) and in different formats (e.g., from a variety of different vendors).

The requirements of an application typically require access to at least one table and, typically, access to several tables. Often in a client/server environment, such tables are in different places and different formats. As illustrated in FIG. 5A, tables may be stored in one or more databases; those databases may be located in a variety of locations—on the client computer, on one or more server computers, or on a mix, with each of those databases implemented under a variety of DBMSs (database management systems).

The development environment provides an approach to data access that enables a user to successfully handle this potential database diversity in the applications a user builds. It does this by separating the DBMS-specific aspects of data access from an application to make it as independent as possible. This means a user can focus on the logical use of a table in his/her application instead of how that table is implemented in one particular database or another.

Figure 5B:
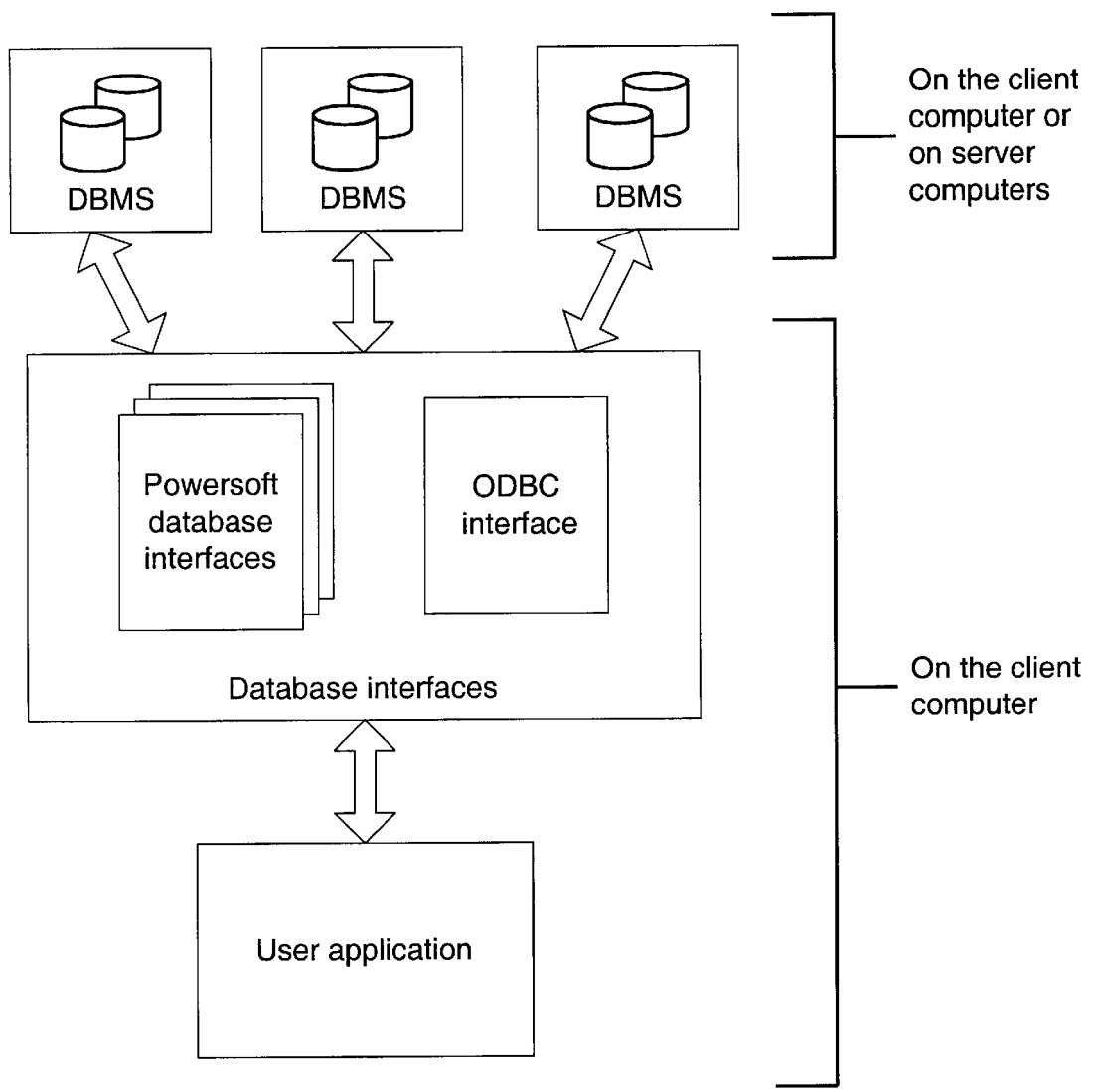
FIG. 5B is a block diagram illustrating a separate software layer—database interfaces—employed in the system for handling DBMS specific operations.

As illustrated in FIG. 5B, the development environment handles DBMS specifics in a separate software layer—database interfaces—that a user installs on the client computer along with his/her application. This layer consists of various database interfaces, each of which knows how to talk to a particular kind of DBMS and how to take advantage of the unique features of that DBMS. When a user's application requests any kind of access to a database, it relies on the appropriate database interface (depending on the DBMS for that database) to carry out the operation.

In an exemplary embodiment, two different kinds of database interfaces are provided for a user's application to use: Microsoft ODBC interface and Powersoft database interfaces. ODBC is the Open Database Connectivity API (application programming interface) developed by Microsoft to give applications standardized access to diverse data sources (which are usually databases, but can also be other kinds of files such as spreadsheets or text files). A user will design his/her application to use this interface if he/she wants to access one or more ODBC-compliant databases. For a database that is not ODBC-compliant, the development environment offers a variety of native interfaces, each of which knows how to talk to a specific DBMS (such as SQL Server or Oracle). If a user wants to access a SQL Server database, for example, a user will design his/her application to use the Powersoft SQL Server interface.

A user can design his/her application to use any combination of these database interfaces. The major benefit of this layered approach to data access is that it helps insulate a user's application from the complicated and potentially dynamic logistics of the typical client/server environment. As a result, the data access a user designs into his/her application is independent of a database's location or DBMS. Adapting a user's application to such changes can often be just a matter of pointing it to the database's new location and database interface. Additionally with the approach, a user can work with all of the tables in his/her application in the same way-using the same table-processing features—regardless of the DBMSs that are involved. Even in cases where a user wants to take advantage of capabilities unique to certain DBMSs (such as stored procedures, outer joins, referential integrity checking), a user will still use consistent techniques to do so.

Figure 6A:
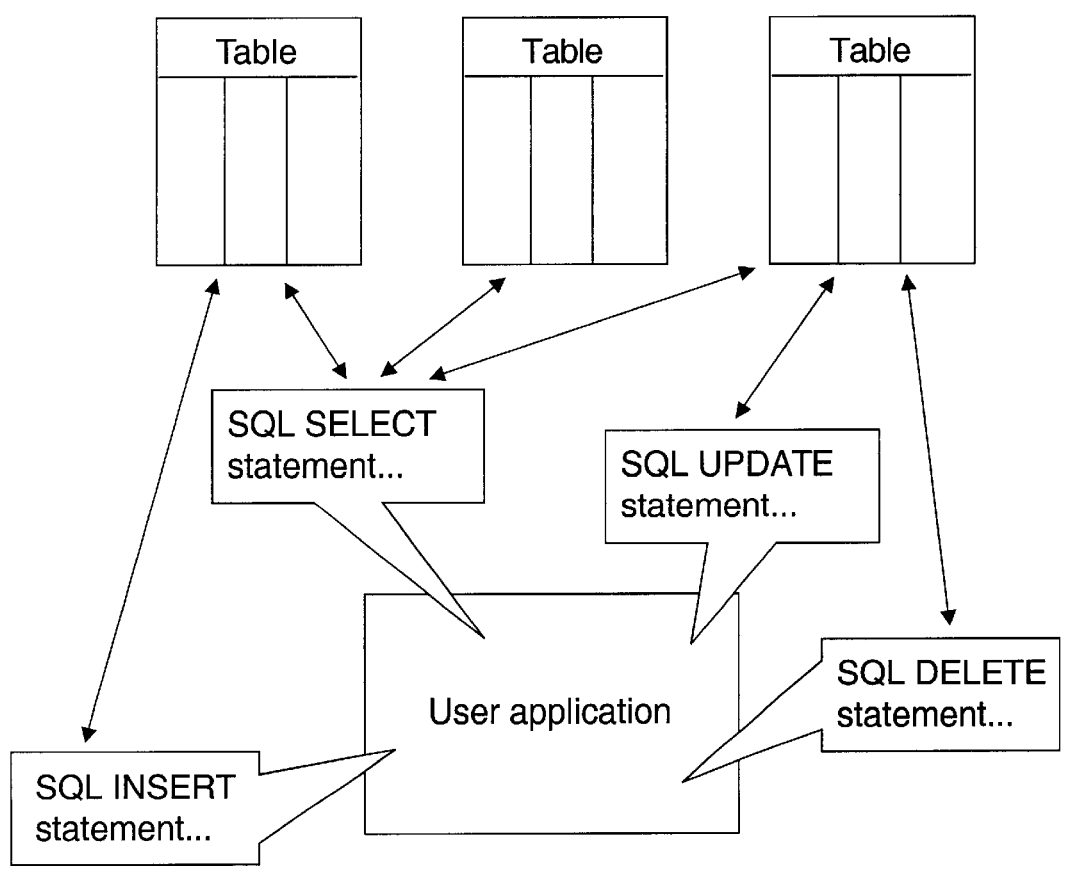
FIG. 6A is a block diagram illustrating use of embedded SQL within a user's application.
Figure 6B:
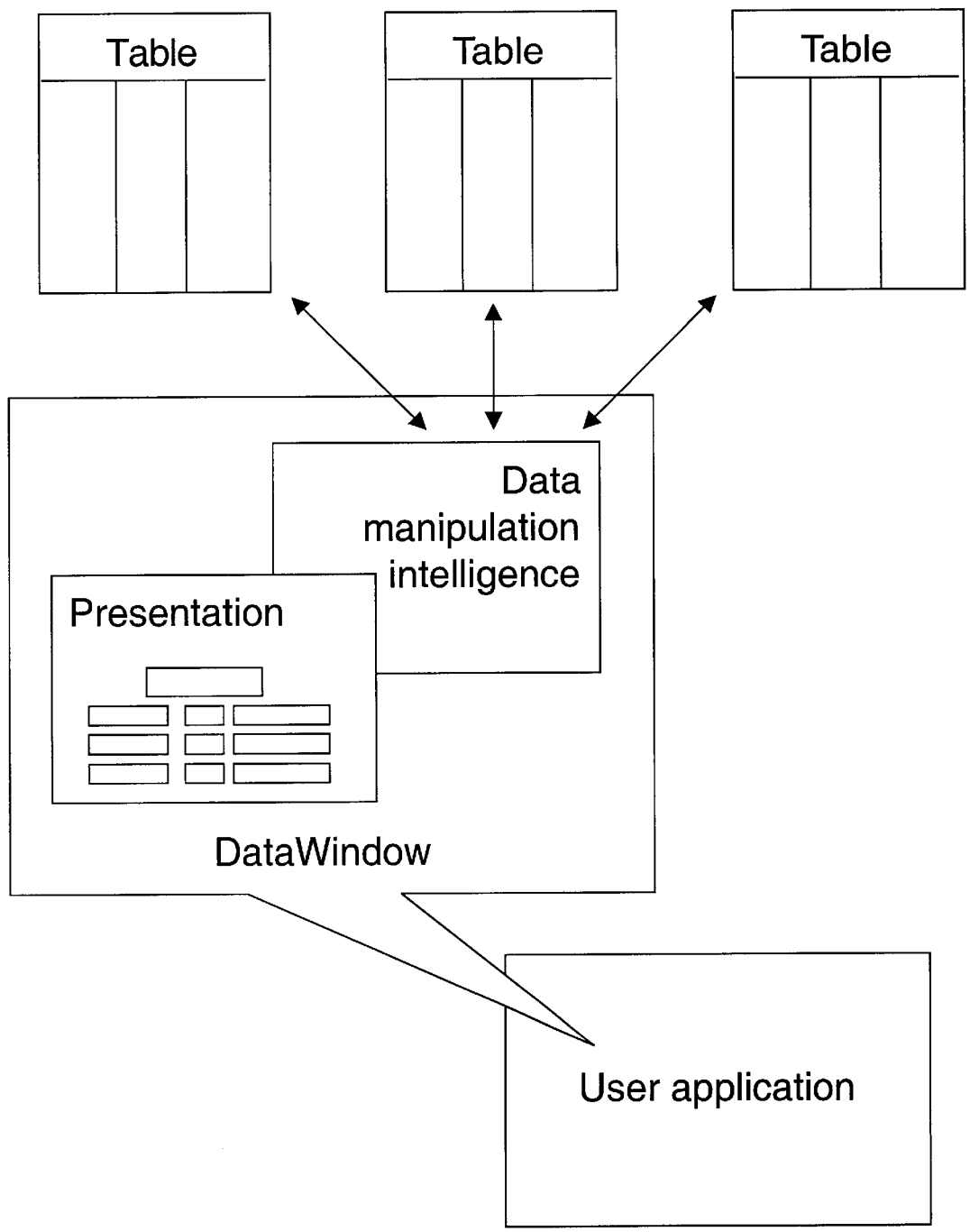
FIG. 6B is a block diagram illustrating use of a Power-Builder Data Windows component in one's application for manipulating and displaying database information.

In a user's application, typically numerous places exist where the application needs to create, retrieve, update, or delete rows in tables. Two basic techniques are provided: embedded SQL and PowerBuilder DataWindows. With the former, the user can embed SQL statements in his/her application to manipulate the rows. The development environment supports all of the usual features of this industry-standard language, along with DBMS-specific syntax and extensions of its own. As illustrated in FIG. 6A, a user employs embedded SQL in places where a user's design calls for row manipulation without the need for display. As illustrated in FIG. 6B, the user uses DataWindows in his/her application to manipulate the rows and display them to the end user. DataWindows are a special access feature of PowerBuilder that a user employs for most of the table processing his/her application design requires. DataWindows contain both the intelligence to do row manipulation (including creation, retrieval, updating, deletion) and the presentation (user-interface) abilities to let people see and work with those rows.

The requirements for the Order Entry application specify that it must process several different tables from the two databases in a variety of different ways. In most cases, the processing involves letting the end user display and/or interact with the table data (using DataWindows). In the remaining situations (where no display of the data is involved), the developers can embed SQL statements in the application to do the job.

4. Implementing the User Interface: Windows and Controls

Figure 7A:
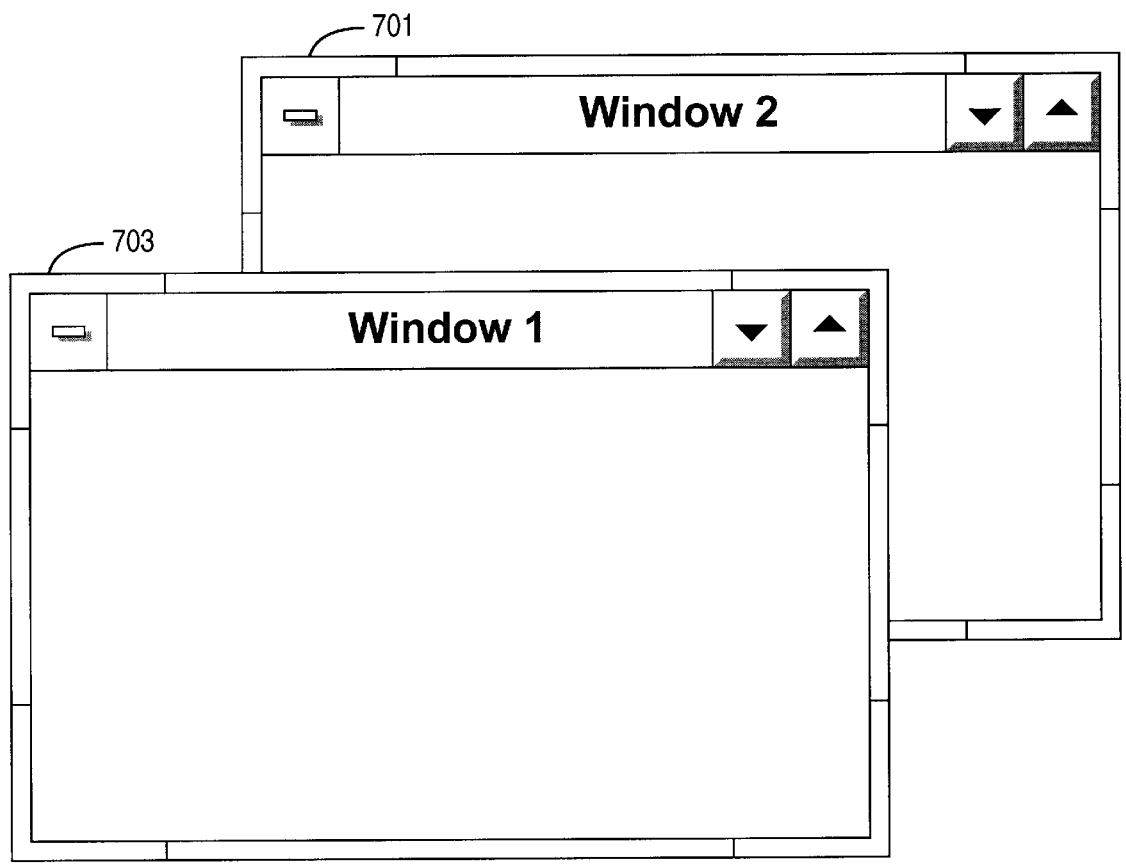
FIG. 7A is a diagram illustrating windows in a graphical user interface, which are employed as major building blocks to construct a user interface for an application developed in the system.

The user-interface requirements of a user's application enable people to interact in a number of ways with data that the application accesses. The user uses windows, such as windows 701 and 703 in FIG. 7A, as major building blocks to construct the user interface of an application in the development environment. Windows—rectangular frames that a user can usually move and resize on the screen—look and work just like the windows a user is already familiar with in his/her graphical operating. Windows provide features a user can use to let people view information, manipulate information, and initiate actions.

Figure 7B:
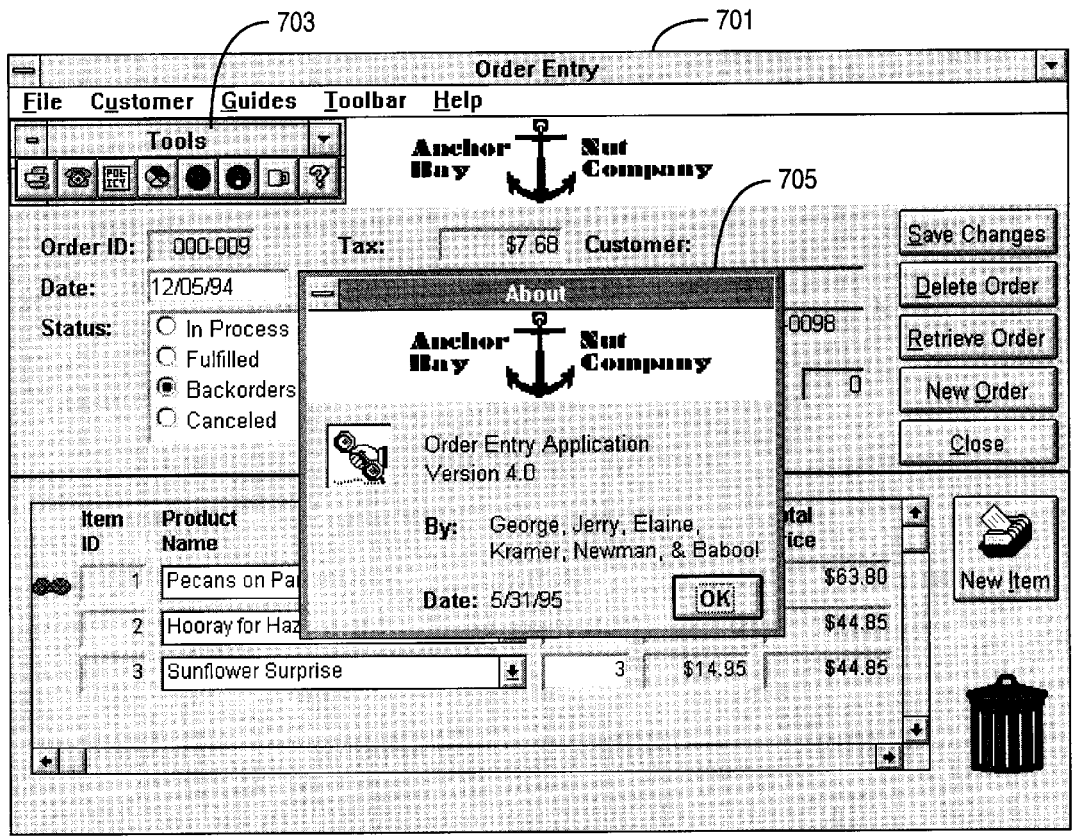
FIG. 7B is a bitmap screen shot illustrating different types of windows provided by the system for use in one's application.
Figure 7C:
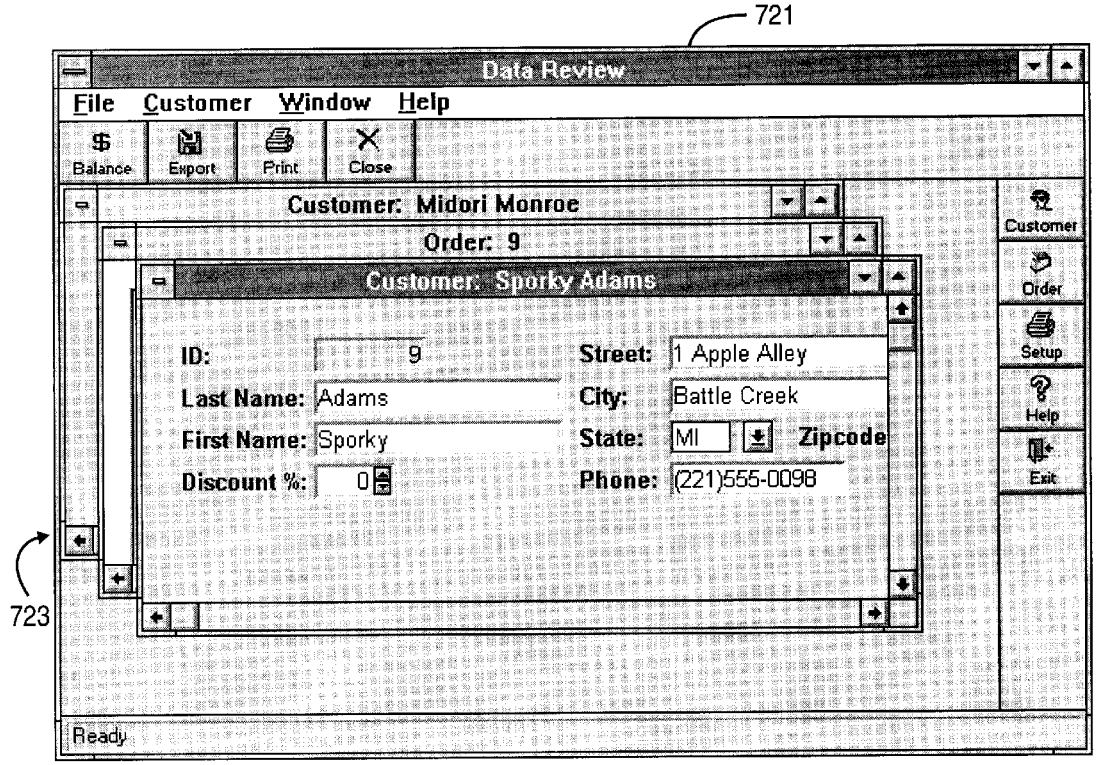
FIG. 7C is a block diagram illustrating use of an MDI (multi-document interface) style window, which can be employed in one's application.

A user can design the user interface of an application to involve just one window. More often, however, a user will involve several different windows, with each one playing a particular role to help the user get a larger job done. The role of any individual window is usually to present a particular kind of information and let users interact with that information in certain ways. As illustrated in FIG. 7B, several different types of windows are provided that a user can use in his/her application. Each type has some unique characteristics that make it good for fulfilling one or more specific presentation or interaction needs. Main windows (e.g., window 701) are where a user will usually have users perform the major activities of the application. Response windows and message boxes (e.g., window 705) are good for situations where one wants to force end users to consider some information and/or choose some action before they can do anything else in the application. Popup windows and child windows (e.g., window 703) are handy for displaying additional pieces of information, or providing additional services, that support the users' activities as they work in a particular main window. As illustrated in FIG. 7C, MDI (multi-document interface) frames (e.g., frame 721) are useful in many applications where end users need a convenient and organized way to work with multiple main windows. When placed inside one of these frames, main windows act as sheets (e.g., sheets 723) that users can easily shuffle around.

Figure 8A:
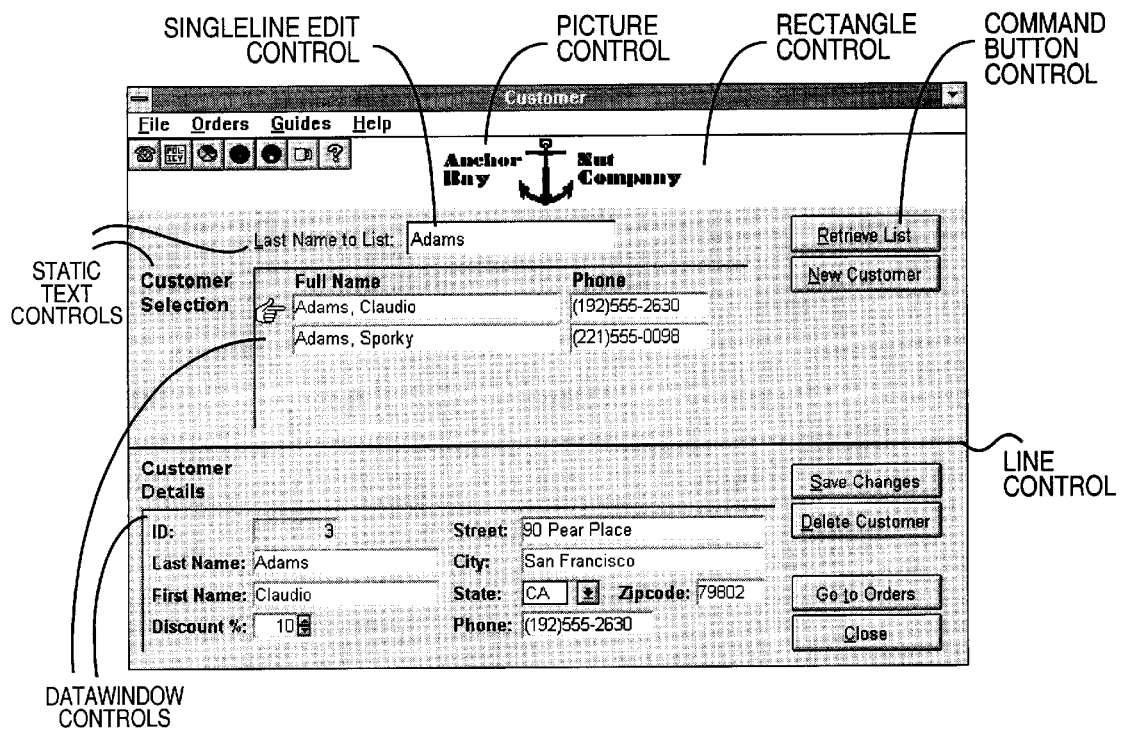
FIG. 8A is a bitmap screen shot illustrating different types of windows or "controls" which can be employed for creating a user interface of one's application.
Figure 8B:
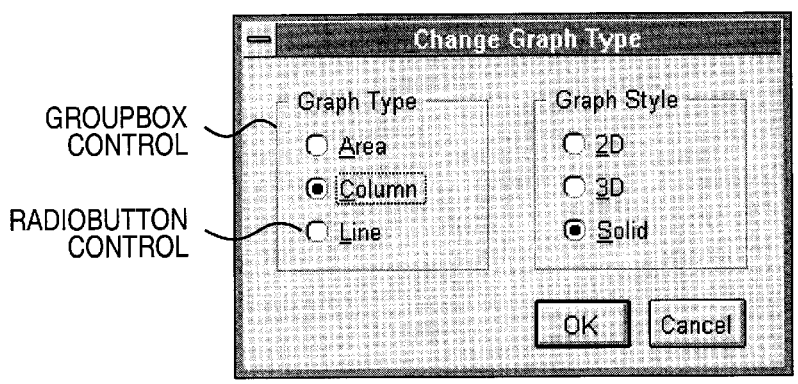
FIG. 8B is a bitmap screen shot illustrating group box and radio button controls.

As shown in FIGS. 8A–B, the development environment provides a wide range of controls a user can place in a window to hold the information end users need to see and to implement the interactions end users need to perform. Controls are provided for: (1) displaying and/or manipulating values (e.g., StaticText, SingleLineEdit, MultiLineEdit, and EditMask controls); (2) making choices (e.g., ListBox, DropDownListBox, CheckBox, and RadioButton controls); (3) showing information graphically (e.g., Graph, HScrollBar, VScrollBar controls); (4) dressing up a window (e.g., GroupBox, Line, Oval, Rectangle, RoundRectangle, and Picture controls); (5) presenting a user's DataWindows (i.e., a special kind of control that a user uses when he/she wants a window to display one of the DataWindows a user has designed for his/her application); and (6) initiating actions (e.g., CommandButton and PictureButton controls).

In addition to the preceding kinds of controls, a user can also use user-defined controls. A user can define his/her own controls based on one or more of the standard PowerBuilder controls and store them as application components called user objects. Then a user can include these custom-made controls in any windows a user wants. Additionally, a user can use third-party controls, such as VBX (Visual Basic extension) controls or controls in DLLs (dynamic link libraries), by defining them as user objects. These external controls can be included in any windows desired.

Figure 9A:
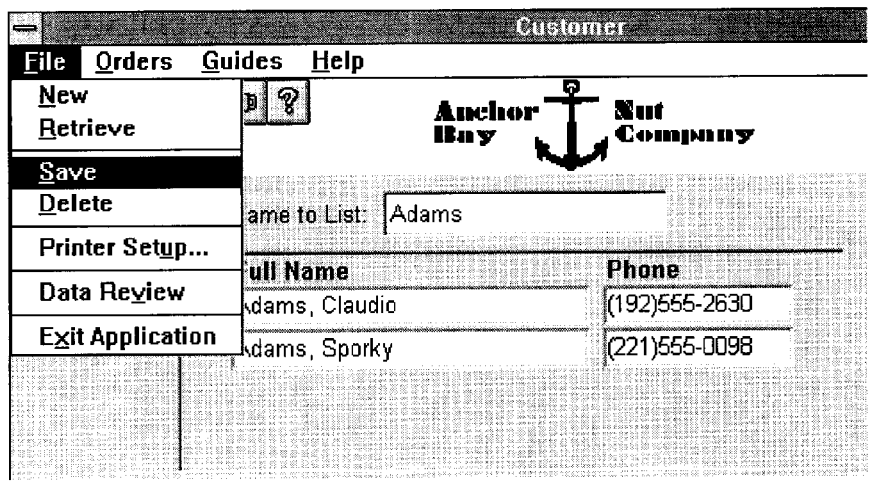
FIGS. 9A–C are bitmap screen shots illustrating user interface components for receiving user input, including a pull down menu, a tool bar, and a popup menu list.
Figure 9B:
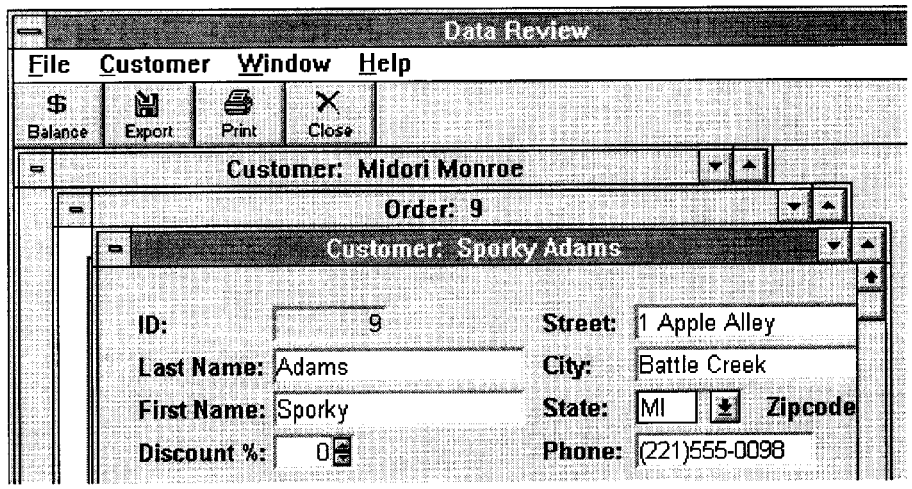
Figure 9C:
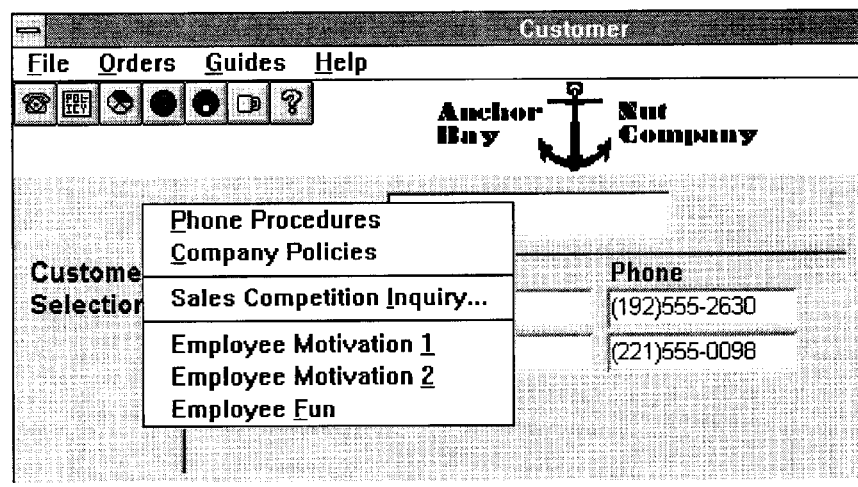

Another way to let the user initiate actions in a window is to use menus. A menu lists commands (menu items) that are currently available so that the user can select one. The development environment provides different methods for presenting menus in a window. In many of the windows a user designs, a user will want to display a menu of one or more items across the top in the menu bar, such as illustrated in FIG. 9A. This enables end users to move through those items and pull down submenus (dropdown menus) that a user has defined for each one. If the window is an MDI frame, a user can optionally define a toolbar, shown in FIG. 9B, to accompany the menu. The toolbar displays buttons corresponding to one or more menu items, giving the user an alternative way to select those items. Sometimes a user may want to let users initiate certain actions by popping up a menu within the window. A popup menu lists its items vertically, shown in FIG. 9C, enabling users to move up or down to select the item they want. Popup menus are handy for giving users quick access to a subset of the most common actions they perform in the window or to adjust those actions that apply to the current control.

5. Controlling the Application's Processing: Events and Scripts

After the user has sketched out the windows he/she needs, the user then specifies the flow of processing in his/her application, both within a window and from one window to another; and supply the specific processing logic that is to be performed for each activity of the application during the course of this flow. Applications created in the development environment are event-driven: an application waits to see what actions a user takes in a window to determine what processing to perform.

Figure 10A:
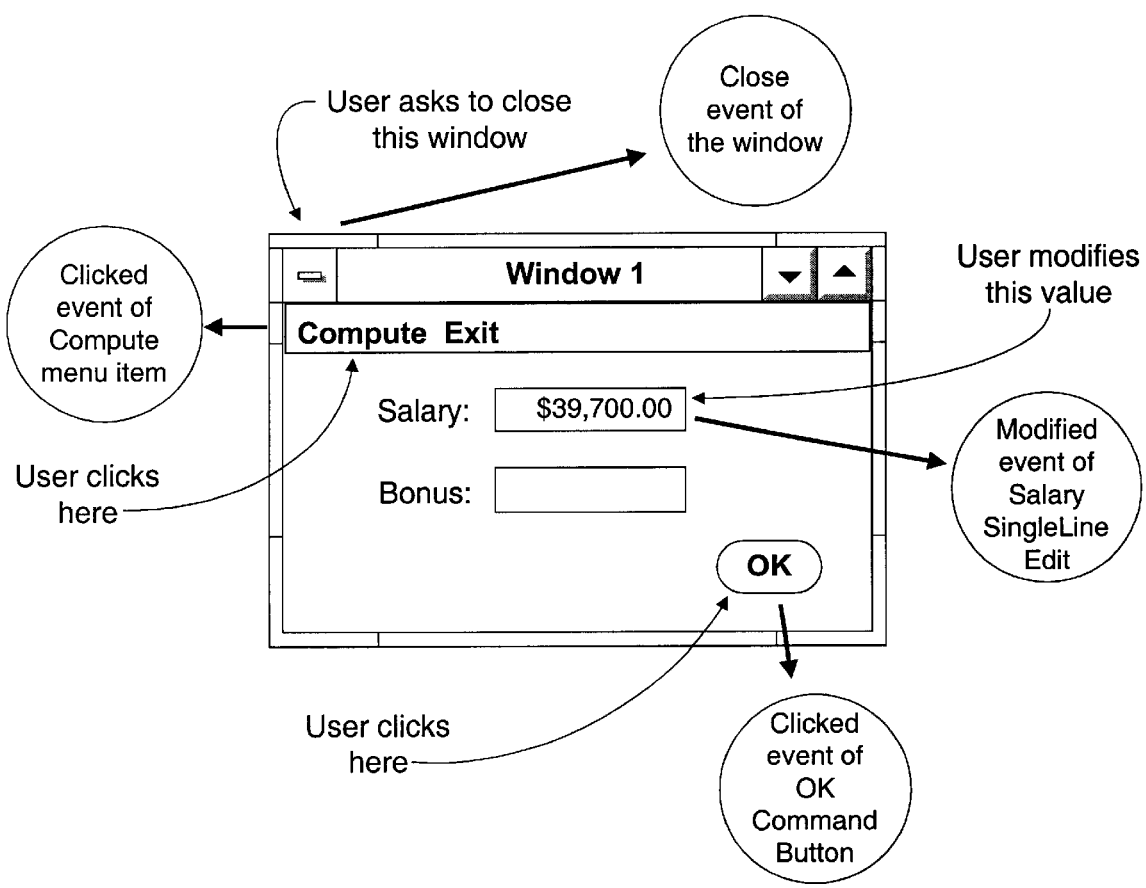
FIG. 10A is a block diagram illustrating different events which are triggered as a result of actions occurring at a user interface.

Whenever the user does something involving one of the application's user-interface components (such as a window, control, or menu item), that action triggers a particular event. As shown in FIG. 10A, for example, each of the following actions triggers a different event.

| Doing this | Triggers |
| --- | --- |
| Clicking on a particular CommandButton control in a window | The Clicked event of that CommandButton control |
| Clicking on a particular menu item in a window's menu | The Clicked event of that menu item |
| Modifying the value in a particular SingleLineEdit control of a window | The Modified event of that SingleLineEdit control |
| Closing a particular window | The Close event of that window |

Figure 10B:
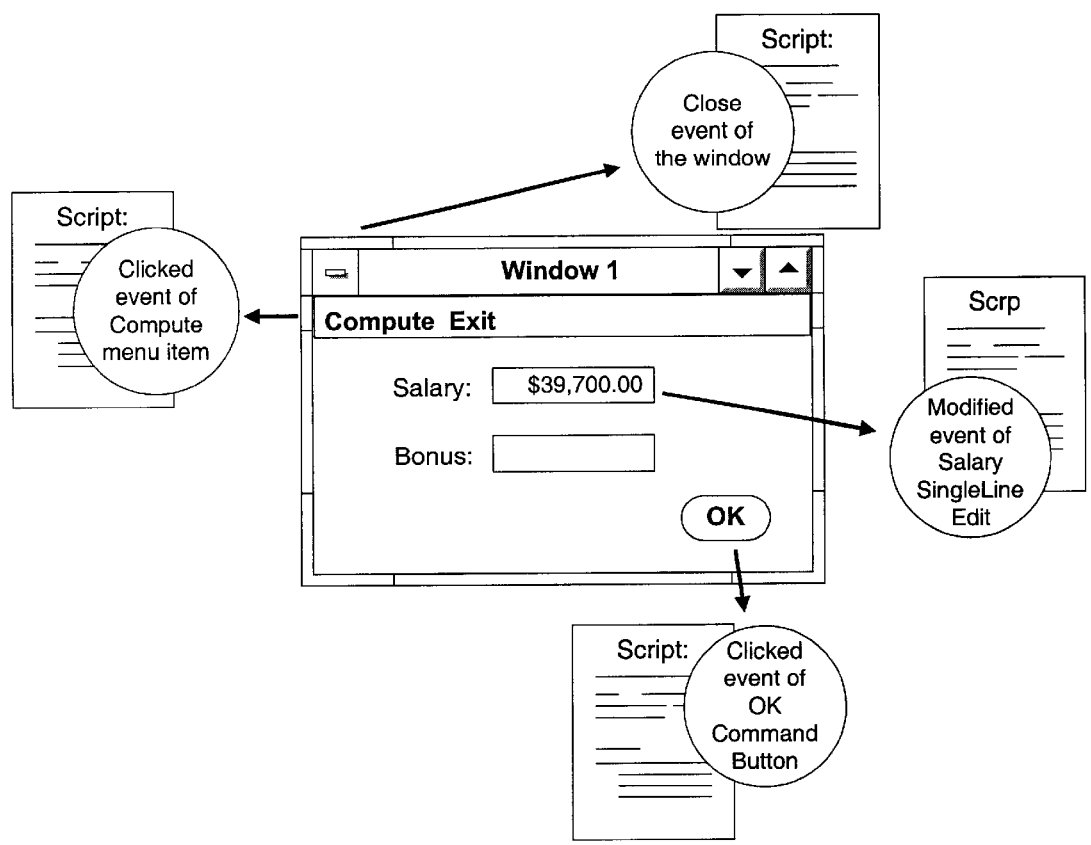
FIG. 10B is a block diagram illustrating execution of user-supplied script (instructions), which is triggered in response to occurrence of an event.

When an event is triggered, a user's application executes a corresponding script (e.g., PowerBuilder PowerScript™), which contains any processing logic a user has written for that event. This is illustrated in FIG. 10B. A user's job as a designer, therefore, is to figure out all of the events of interest that might occur in his/her application and to provide appropriate processing logic for each event (in its script).

Each kind of user-interface component has its own set of several different events that can happen to it, including, for instance, the following.

| This component | Has |
| --- | --- |
| A CommandButton control | About a dozen different events, including: Clicked, GetFocus, and LoseFocus |
| A menu item | Just a couple of events: Clicked and Selected |
| A SingleLineEdit control | About a dozen different events, including: Modified, GetFocus, and LoseFocus |
| A window | More than 25 different events, including: Open, Close, Resize, Timer, and Clicked |

Some events apply to a user's application as a whole, including (1) one that is triggered when the application starts (the Open event), and (2) one that's triggered when the application ends (the Close event). In many cases, a user need only write scripts for just one or two of the events of a particular component (and sometimes a user won't need any for that component).

Letting end users drive the flow of processing is appropriate most of the time, but on occasion a user will want the application to temporarily take control. In such situations, the user can write code in the script of one event that manually causes another event to occur. When doing this, a user can either trigger the event so that its script executes right away, or post the event to a queue so that its script execution is deferred (until after the scripts of any earlier events have executed). A user can also define his/her own events for any particular component and then manually trigger or post them to execute their scripts. These "user events" are useful for extending the processing of other event scripts by serving as subroutines; and responding to certain lower-level messages (from a user's operating environment) that the development environment does not provide as standard events.

Figure 11A:
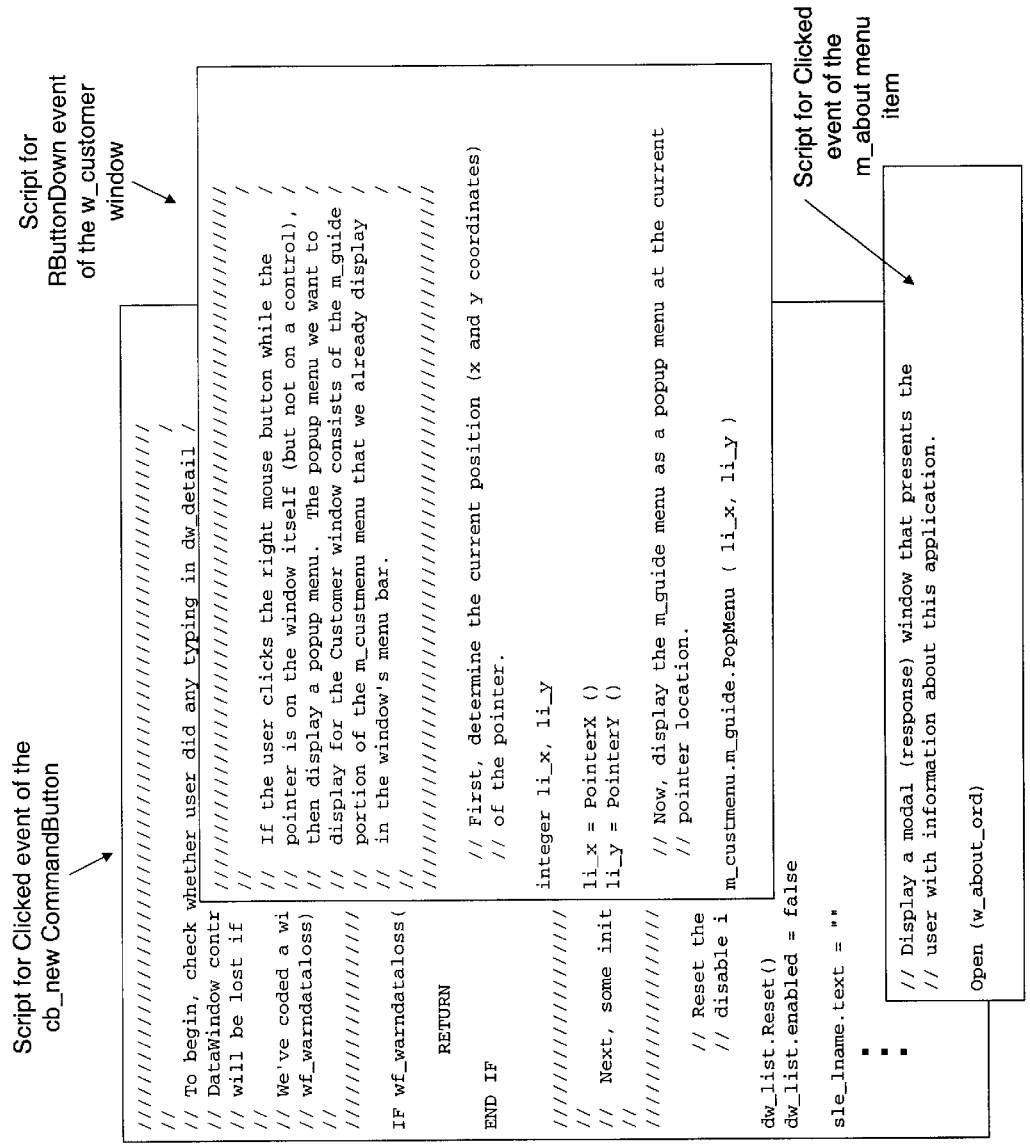
FIG. 11A is a diagram illustrating use of script or procedural code, for responding to events which occur in the system.

Once a user knows which events he/she needs to handle in his/her application, a user provides an appropriate script for each one. As illustrated in FIG. 11A, a script is a body of procedural code that a user writes in the PowerScript™ language to express the processing logic to perform, typically in response to particular events. Most scripts are relatively short (tens of lines long, not hundreds), since they just need to express the processing for particular events and not for the whole application.

PowerScript is a high-level language that provides several different syntactic constructs a user can use to write the code he/she needs. As shown in FIGS. 11B–C, these include variable declarations, PowerScript statements, function calls (built-in and user-defined), embedded SQL statements, and comments. PowerScript supports many data types, as well as arrays and structures of variables. It also provides several levels of scoping that a user can choose from for each variable he/she declares. PowerScript statements provide flow-of-control mechanisms (such as branching and looping) that a user can use to steer the processing in a particular script. When a user creates a user-defined function, he/she specifies the arguments required (if any), a script of the code that is to execute, and the value it is to return (if any). A user can then call that user-defined function from event scripts or from other user-defined functions.

6. Mapping the Requirements of the Application

In the example of the hypothetical company, Anchor Bay Nut Company, the user would map processing requirements to development environment features as follows. The Order Entry application needs to handle a number of different events for its various windows, controls, and menus. For instance, consider the application's Customer window. To provide all of the processing for the window of FIG. 8A, for instance, scripts are required for each of the following events.

| Type of component | Name | Events that need scripts |
|---|---|---|
| Window | w_customer | Open, RButtonDown |
| CommandButton control | cb_close | Clicked |
| | cb_delete | Clicked |
| | cb_new | Clicked |
| | cb_orders | Clicked |
| | cb_retrieve | Clicked |
| | cb_save | Clicked |

-continued

| Type of component | Name | Events that need scripts |
|---|---|---|
| DataWindow control | dw_detail | Clicked, RowFocusChanged, Uevent_keypressed (a user event) |
| | dw_list | EditChanged, ItemChanged, ItemError |
| SingleLineEdit control | sle_lname | Modified |
| Menu item listed under File | m_new | Clicked |
| | m_retrieve | Clicked |
| | m_save | Clicked |
| | m_delete | Clicked |
| | m_printersetup | Clicked |
| | m_reviewdata | Clicked |
| | m_exit | Clicked |
| Menu item listed under Orders | m_goto | Clicked |
| Menu item listed under Guides | m_phoneprocedures | Clicked |
| | m_companypolicies | Clicked |
| | m_salescompetition inquiry | Clicked |
| | m_employee motivationa | Clicked |
| | m_employee motivationb | Clicked |
| | m_employeefun | Clicked |
| Menu item listed under Help | m_contents | Clicked |
| | m_about | Clicked |

The Order Entry application may include user-defined functions to provide additional processing services that can be called from the event scripts. For example, the application's Customer window can includes the three following user-defined functions.

| User-defined function | Purpose |
|---|---|
| wf_delcustorders | To be called whenever the user asks to delete a customer to make sure the customer does not have any outstanding orders in the database |
| wf_newcustnum | To be called whenever the user asks to add a customer to compute the next available ID number for a new customer in the database |
| wf_warndataloss | To be called at the beginning of various operations to check whether any unsaved data might be lost and to warn the user |

The wf_delcustorders function may be constructed, for examle, as shown in FIG. 11D.

C. Java Language Implementation

Also before describing the Java access object of the present invention in detail, it is helpful to review the Java™ programming language. In the early 1990s, a team at Sun Microsystems developed a new language, "Java," to address the issues of software distribution on the Internet. Java is a simple, object-oriented language which supports multi thread processing and garbage collection. Although the language is based on C++, a superset of C, it is much simpler. More importantly, Java programs are "compiled" into a binary format that can be executed on many different platforms without recompilation. The language includes built-in mechanisms for verifying and executing Java "binaries" in a controlled environment, protecting the user's computer from potential viruses and security violations. References herein to Java and Java™ refer to the Java programming language. References to JavaBeans™, Swing, and other components of the Java programming language refer to versions of the Java programming language supporting JavaBeans, Swing and other such components (e.g., JDK versions 1.1 and subsequent).

A typical Java system comprises the following set of interrelated technologies: a language specification; a compiler for the Java language that produces bytecodes from an abstract, stack-oriented machine; a virtual machine (VM) program that interprets the bytecodes at runtime; a set of class libraries; a runtime environment that includes bytecode verification, multi-threading, and garbage collection; supporting development tools, such as a bytecode disassembler; and a browser (e.g., Sun's "Hot Java" browser).

Java is designed for creating applications that will be deployed into heterogeneous networked environments. Such environments are characterized by a variety of hardware architectures. Further, applications in such environments execute atop a variety of different operating systems and interoperate with a multitude of different programming language interfaces. To accommodate such diversity, the Java compiler generates platform-neutral "bytecodes"—an architecturally neutral, intermediate format designed for deploying application code efficiently to multiple platforms.

Java bytecodes are designed to be easy to interpret on any machine. Bytecodes are essentially high-level, machine-independent instructions for a hypothetical or "virtual" machine that is implemented by the Java interpreter and runtime system. The virtual machine, which is actually a specification of an abstract machine for which a Java language compiler generates bytecode, must be available for the various hardware/software platforms which an application is to run. The Java interpreter executes Java bytecode directly on any machine for which the interpreter and runtime system of Java have been ported. In this manner, the same Java language bytecode runs on any platform supported by Java.

Compiling Java into platform-neutral bytecodes is advantageous. Once the Java language interpreter and runtime support are available on a given hardware and operating system platform, any Java language application can be executed. The bytecodes are portable since they do not require a particular processor, architecture, or other proprietary hardware support. Further, the bytecodes are byte-order independent, so that programs can be executed on both big-endian machines (e.g., Intel architecture) and little-endian machines (e.g., Motorola architecture). Since Java bytecodes are typed, each specifies the exact type of its operands, thereby allowing verification that the bytecodes obey language constraints. All told, the interpreted bytecode approach of compiled Java language programs provides portability of programs to any system on which the Java interpreter and runtime system have been implemented.

The bytecodes are actually stored in "class" files. Each class file stores all the information for a particular Java class. A "class" in Java is a software construct which defines instance variables and methods, in effect, serving as a template for creating objects of a particular type (i.e., having data and behavior associated with instances of that class). The Java language does not support global functions or variables. Thus, each method (function) and variable exists within a class or an object (an instance of a class). In the Java language, the simplest form of a class definition is as follows.

class name{
    . . .
}

The keyword class begins the class definition for a class named name. The variables and methods of the class are embraced by the curly brackets that begin and end the class definition block. A very simple "Point" class, for instance, may be declared as follows.

```
class Point {
    public double x;    /* instance variable */
    public double y;    /* instance variable */
}
```

This declaration serves as a template from which "Point" objects can be instantiated.

Actual instantiation of an object occurs in a manner similar to that found in the C++ programming language. The data associated with a class or object is stored in variables; the behavior associated with a class or object is implemented with methods. Methods are similar to the functions or procedures in procedural languages such as C. For example, a variable which refers to a "Point" object can be declared as follows.

Point myPoint;

An instance of a point object is allocated as follows.

myPoint=new Point( );

Here, one can now access variables of the "Point" object, using familiar "dot" notation for referring to the names of the variables.

myPoint.x=10;

mypoint.y=20;

Objects communicate by sending messages to each other. A recipient object responds to a message by selecting a particular method to execute. If one object wants another object to do some work on its behalf, for instance, the first object sends a message to the second object. The second object, in response, invokes the method which is appropriate for processing the message. The methods themselves, therefore, define the behavior of objects instantiated from a class. In particular, it is an object's methods which manipulate the object's data—its instance variables.

The entry point of every Java application is its main method. When the user runs an application with the Java interpreter, he or she specifies the name of the class which is desired to be run. In response, the Java interpreter invokes the main method defined within that class. The main method controls the flow of the program, including allocating whatever resources are needed and invoking any other methods that provide the functionality for the application.

Every Java application must contain a main method with the following prototype or signature (i.e., modifiers, name, and parameters).

public static void main(String[ ] args)

The method signature for the main method contains three modifiers: public, static, and void. The public modifier indicates that the main method can be called by any object. The static modifier indicates that the main method is a class method. The void modifier indicates that the main method returns no value. The main method in the Java language is similar to the main function in C and C++. When the Java interpreter executes an application (by being invoked upon the application's controlling class), it starts by calling the class's main method. The main method then calls all the other methods required to run your application.

The Java Language is well documented in the technical, trade, and patent literature; see e.g., Gosling, J. et al., *The Java Language Environment*: A White Paper, Sun Microsystems Computer Company, October 1995. For a description of runtime execution of Java modules (including dynamic linking), see e.g., James Gosling, Bill Joy, and Guy Steel, *The Java Language Specification*, Chapter 12: *Execution* (particularly 12.2 Loading of Classes and Interfaces, and Linking of Classes and Interfaces), Addison Wesley, 1996. The disclosures of each of the foregoing are hereby incorporated by reference.

With an understanding of how an application is designed in the integrated development environment of the system of the present invention and with an understanding of the Java programming language, the methods of the present invention for implementing a Java-based data access object—a "Java DataWindow"—can now be better understood.

Java-based Data Access Object

A. Introduction

As described above (and in above-mentioned commonly-owned U.S. Pat. No. 5,566,330), the DataWindow is a unique type of component or object used to retrieve, display, and manipulate data from a relational database or other data source. DataWindow objects have knowledge about the data they are retrieving, and present information according to user-specified display formats, presentation styles, validation rules, expressions and other data properties, so dynamic data is used in the most meaningful way. In accordance with the present invention, the following describes modification made to the DataWindow component for providing a Java-based DataWindow. The Java-based DataWindow allows code-less creation and layout of forms, database queries, and result sets, automatic run-time generation of HTML and script for full range of DataWindow functionality.

B. DataWindow Architecture and Usage Relevant to Java DataWindow

1. Objects, Controls, and Components

DataWindow technology is implemented in two parts: a DataWindow object and a DataWindow control or component. The DataWindow object defines the data source and presentation style for the data. The control or component is a container for the DataWindow object in the application. The user (developer) writes code that calls methods of the container to manipulate the DataWindow object. The DataWindow was originally invented for use in PowerBuilder to provide powerful data retrieval, manipulation, and update capabilities for client/server applications. In accordance with the present invention, the DataWindow is extended for use in a Java environment as a JavaBeans component for use in Java applications, including client-side Java applets.

A DataWindow object is an object that the user uses to retrieve, present, and manipulate data from a relational database or other data source (such as an Excel worksheet or dBASE file). The user can specify whether the DataWindow object supports updating of data. DataWindow objects have knowledge about the data they are retrieving. The user can specify display formats, presentation styles, and other data properties to make the data meaningful to end users. In the DataWindow painter, the user can also make Powersoft report (PSR) files, which can be used in DataWindow controls or components. A PSR file contains a report definition—essentially a nonupdatable DataWindow object—as well as the data contained in the report when the PSR file was created. It does not retrieve data.

The user defines DataWindow objects in the DataWindow painter in PowerBuilder or DataWindow Builder. DataWindow Builder has all the painters necessary for working with databases and defining DataWindows without the overhead of a full PowerBuilder installation. When the user defines a DataWindow object, he or she chooses a presentation style and a data source. A presentation style defines a typical style of report and handles how rows are grouped on the page. The user can customize the way the data is displayed in each presentation style. The presentation styles available for the Java DataWindow are listed below (with exceptions shown):

| Presentation style | Description |
| --- | --- |
| Tabular | Data columns across the page and headers above each column. Several rows are viewable at once |
| Freeform | Data columns going down the page with labels next to each column. One row displayed at a time |
| Grid | Row-and-column format like a spreadsheet with grid lines. Users can move borders and columns |
| Label | Several labels per page with one row for each label. Used for mailing and other labels |
| N-Up | Two or more rows of data next to each other across the page. Useful for periodic data, such as data for each day or the week or each month in the quarter |
| Group | A tabular style with rows grouped under headings. Each group can have summary fields with computed statistics |
| Composite | Several DataWindow objects grouped into a single presentation Not supported by Web DataWindow |
| Graph | Graphical presentation of data Not supported in DataWindow, Java Edition or Web DataWindow |
| Crosstab | Data summary in a row-and-column format |
| RichText | Paragraphs of text with embedded data columns Not supported in DataWindow, Java Edition, Web control for ActiveX, or Web DataWindow |
| OLE | An OLE object linked or embedded in the DataWindow and associated with the retrieved data Not supported in DataWindow, Java Edition or Web DataWindow |

2. Data Sources

The data source specifies where the data in the Java DataWindow comes from and what data items will be displayed. Data can come from tables in a database, or one can import data from a file or specify the data in code. For databases, the data specification is saved in a SQL statement. In all cases, the Java DataWindow object saves the names of the data items to be displayed and their data types. The data sources include:

| Data source | Description |
| --- | --- |
| Quick Select | The data is coming from one or more tables in a SQL database. The tables must be related through a foreign key. You only need to choose columns, selection criteria, and sorting |
| SQL Select | You want more control over the select statement that is generated for the data source. You can specify grouping, computed columns, and so on |
| Query | The data has already been selected and the SQL statement is saved in a query object that you've defined in the Query painter. When you define the DataWindow object, the query object is incorporated into the DataWindow and doesn't need to be present when you run the application |
| Stored procedure | The data is defined in a database stored procedure |
| External | The data is not stored in a database, but will be imported from a file (such as a tab-separated or dBASE file) or populated from code |

3. Basic Usage

Using a DataWindow involves two main steps. First, one uses the DataWindow painter in either DataWindow Builder or PowerBuilder to create or edit a DataWindow object. In the painter, the user defines the data source, presentation style, and all other properties of the object, such as display formats, validation rules, sorting and filtering criteria, and graphs. In the development environment, the user puts a DataWindow control or component in a window, form, or web page and associate a DataWindow object with it. It is through this control that one's application communicates with the DataWindow object created in the DataWindow painter. The user writes code to manipulate the DataWindow control and the DataWindow object it contains. Typically, one's code retrieves and updates data, changes the appearance of the data, handles errors, and shares data between DataWindow controls. Thus, the DataWindow control is a container for DataWindow objects in an application. It provides properties, methods, and events for manipulating the data and appearance of the DataWindow object, with the DataWindow control part supporting the user interface of one's application.

To use the DataWindow object in an application, one adds a DataWindow control to a window or form, then associate that control with the DataWindow object. When one places a DataWindow control in a window or form, it gets a default name. Typically, one changes the name to be something meaningful for the application under development. In PowerBuilder, the name of the control has traditionally had a prefix of dw_. This is a useful convention to observe in any development environment. For example, if the DataWindow control lists customers, it could be named dw_customer. In code, one always reference a DataWindow by the name of the control (such as dw_customer). One does not refer to the DataWindow object that is in the control. To avoid confusion, one typically would use different prefixes for DataWindow objects and DataWindow controls. The prefix d_is commonly used for DataWindow objects. For example, if the name of the DataWindow control is dw_customer, one might want to name the corresponding DataWindow object d_customer.

To place a DataWindow control in a window, one perceived as follows. First, the user opens the window that will contain the DataWindow control. Now, selecting Insert>Control>DataWindow from the menu bar places at the control within the window. Here, the user clicks where he or she wants the control to display. PowerBuilder places an empty DataWindow control in the window. Optionally, the developer user may resize the DataWindow control by selecting it and dragging one of the handles.

After placing the DataWindow control, the user can associate a DataWindow object with the control. To associate a DataWindow object with the control, one proceeds as follows. In the DataWindow Properties view, the user clicks the Browse button for the DataObject property. Now, the user selects the DataWindow object that here she wants to place in the control and then clicks OK. The name of the DataWindow object displays in the DataObject box in the DataWindow Properties view. Option line, the user can change the properties of the DataWindow control as needed. Once the user has associated a DataWindow object with a DataWindow control in a window, he or she can go directly to the DataWindow painter to edit the associated DataWindow object. To edit an associated DataWindow object, the user selects Modify DataWindow from the DataWindow control's popup menu. In response, PowerBuilder opens the associated DataWindow object in the DataWindow painter.

C. Java DataWindow (DataWindow, Java Edition)

1. Introduction

In accordance with the present invention, a Java-based data access object is provided in the form of a Java DataWindow (DataWindow, Java Edition). It comprises a set of JavaBeans components and associated classes for use in Java applications. It implements all the features of the PowerBuilder DataWindow except rich text, graphs, and OLE. Nearly all PowerBuilder events and methods are also supported in the JavaBeans components. It supports data retrieval with retrieval arguments and data update. The user can use edit styles, display formats, and validation rules. Most of the PowerBuilder methods for manipulating the DataWindow are available, including Modify for changing DataWindow object properties.

The DataWindow includes these components: DataWindow JavaBeans component and DataStore JavaBeans component. The former comprises the complete DataWindow, which supports data retrieval and management, layout and display of data, and user interaction and data update capabilities. The latter comprises a DataWindow with data retrieval and update but no onscreen data display and user interaction. It can be used to manage data and share data with other components without displaying the data, for example, in a server application or as a data source for other DataWindow components. It can also provide an alternative data layout for printing data. There are two versions of the DataWindow JavaBeans component: a native component (DataWindowControl) and a lightweight Swing component (JDataWindowControl). Both are available from the DataWindow component palette. Both have the same methods and events. If the application under development uses Java Swing components, one should use the JDataWindowControl instead of DataWindowControl.

The DataWindow and DataStore JavaBeans components use a DataWindow object, which determines what data is retrieved and how it is displayed. The DataWindow component can also display Powersoft reports (PSRs), which do not need need to retrieve data. A DataWindow object for the JavaBeans components can have any presentation style except RichText, Graph, or OLE. If the DataWindow object includes graph or OLE controls, they are ignored.

2. Coding for the DataWindow JavaBeans Component (a) General

In general, the user employs the same methods as in a PowerBuilder application. However, there are a few differences. Some methods are not supported, including methods that use the system clipboard and methods for manipulating graphs, rich text, and OLE. PowerBuilder has several date and time data types; but in Java, these all map to a Date object. PowerBuilder enumerated data type values are implemented as fields. One can specify the field name or the associated numeric value.

(b) Setup/Initialization

The following shows setup for using a Java DataWindow control.

```
private powersoft.datawindow.DataWindowControl   dw_1;
private powersoft.powerj.db.Transaction   transaction_1;
    . . .
transaction_1.registerDriver( "sun.jdbc.odbc.JdbcOdbcDriver" );
transaction_1.setDriverName( "sun.jdbc.odbc.JdbcOdbcDriver" );
    transaction_1.setDataSource( "jdbc:odbc:EAS Demo DB V3" );
    transaction_1.setUserID("dba");
transaction_1.setPassword("sql");
transaction_1.setAutoCommit(true);
transaction_1setLoginTimeout( 0 );
transaction_1.connect();
    dw_1.setSourceFileName( "datawindow.pbl" );
    dw_1.setDataWindowObjectName( "d_crosstab" );
    dw_1.setTransaction( transaction_1 );
    dw_1.retrieve();
```

As shown, set up basically consists of connecting to the database (e.g., through an JDBC-ODBC bridge) and filling the DataWindow with data.

(c) Examples

Suppose that once having established a Java DataWindow and gotten it to fill itself with values from the database (e.g., with simple setTransaction( ) and retrieve( ) method calls), the user would like to see only those rows in which the customer quantity exceeds 100 and the customer code exceeds 30. With conventional grid controls, the user would have to rebuild the SQL select statement and refill the contents. With the Java DataWindow, however, the user need only do the following:

dw_1.setFilter("cust_qty>100 and cust_code>30");
dw_1.filter( );

Now even the end user may specify his or her own filter by calling setFilter( null), which brings up a dialog box which allows the user to build his or her own filter.

Now suppose that the user would like to change the color of the salary field text to red if the value is more than $90,000 and the department code is 100, blue if the value is more than $90,000 and the department code is not 100, and green otherwise. In a standard grid control, if it was even possible, one would have to take over the responsibility of doing some of the painting code. With the Java DataWindow, the user need only do the following:

dw_1.modify("salary.Color='0\tIf(salary>90000,If(dept_id=100,255,16711680), 65280)'");

Now, the user would like to make sure that only uppercase letters are allowed in the emp_state column. In the Java DataWindow, this is easily accomplished by the following:

dw_1.setValidate("emp_state", "Match(GetText( ), \"[A-Z]+\")");

When the end user enters data that contains a non-uppercase letter (or a non-letter), an ItemError event will occur, at which point one can choose to reject the data, accept the data, reject the data but allow the user to tab out of the field or reject the data, and show a message box informing the end user of the error.

D. Java DataWindow Architecture

1. Architectural Changes Made to Support Java

The following architectural changes are made to the DataWindow for implementing the Java DataWindow. Unlike PowerBuilder, the Java version of the DataWindow follows the Java naming convention for methods. The resulting difference is that the first letter of every method is upper case in PowerBuilder and lower case in Java. For example, in PowerBuilder:

dw_1.Modify("DataWindow.Table.Select=''");
and in Java:
dw_1.modify("DataWindow.Table.Select=''");

The event mechanism for events is different in PowerBuilder and Java, although for user familiarity/compatibility reasons, it is desirable to make them as similar to use as possible. In a rapid application development (RAD) environment, like Sybase PowerJ, handling an event is as easy as clicking a button. Should the (developer) user wish to add support for handling an event at run-time rather than design-time, it is slightly more difficult, although its still quite reasonable. Here, the user finds the event listener interface for the event of interest. It will have a formatted name, such as:

powersoft.datawindow.event.<EventName>Listener

Now, the user chooses a class to implement this interface, typically the form the user originally placed the DataWindowControl (or DataStore) on. Then, the user writescode the method that corresponds to the specific event to code against. After that, all that is required is to cause that event to be enabled is call add<EventName>Listener(<object that implements listener interface>) on the DataWindowControl (or DataStore).

In Java, passing a primitive data type (short,int,char, ... ) by reference is not supported. Whereas PowerBuilder passes primitive data types by reference, in Java, they are passed as a one-element array of that type. Example:

In PowerBuilder:
long row=1;
integer colnbr=0;
string colname;
dw_1.FindRequired(Primary!, row, colnbr, colname, FALSE);

In Java:
int row[ ]={1};
short colnbr[ ]={1};
String colname[ ]={null};
dw_1.findRequired(dw_1.Primary, row, colnbr, colname, false);

2. Dot Notation-like Support

Dot notation is a popular coding technique available in several environments.

This is emulated in Java DataWindow using getproperty( ) and getObject( ) methods. The getObject( ) method returns an intermediary object, while getProperty( ) returns final objects. The following is an example of how to retrieve the original values from the filtered buffer of the emp_lname column:

String[ ] data=
(String[ ])dw_1.getObject("emp_lname").getObject ("Filter").getProperty("Original"); The return type of getObject( ) is DataWindowObject, which is the same type passed to the user in events such as ButtonClickEvent, ItemEvent, MouseEvent and EditChangedEvent. The objectString member of DataWindowObject denotes the name of the object, the various is*( ) functions denote what type of object it is, and the other members denote other information such as column number.

3. Client Structure

Figure 12A:
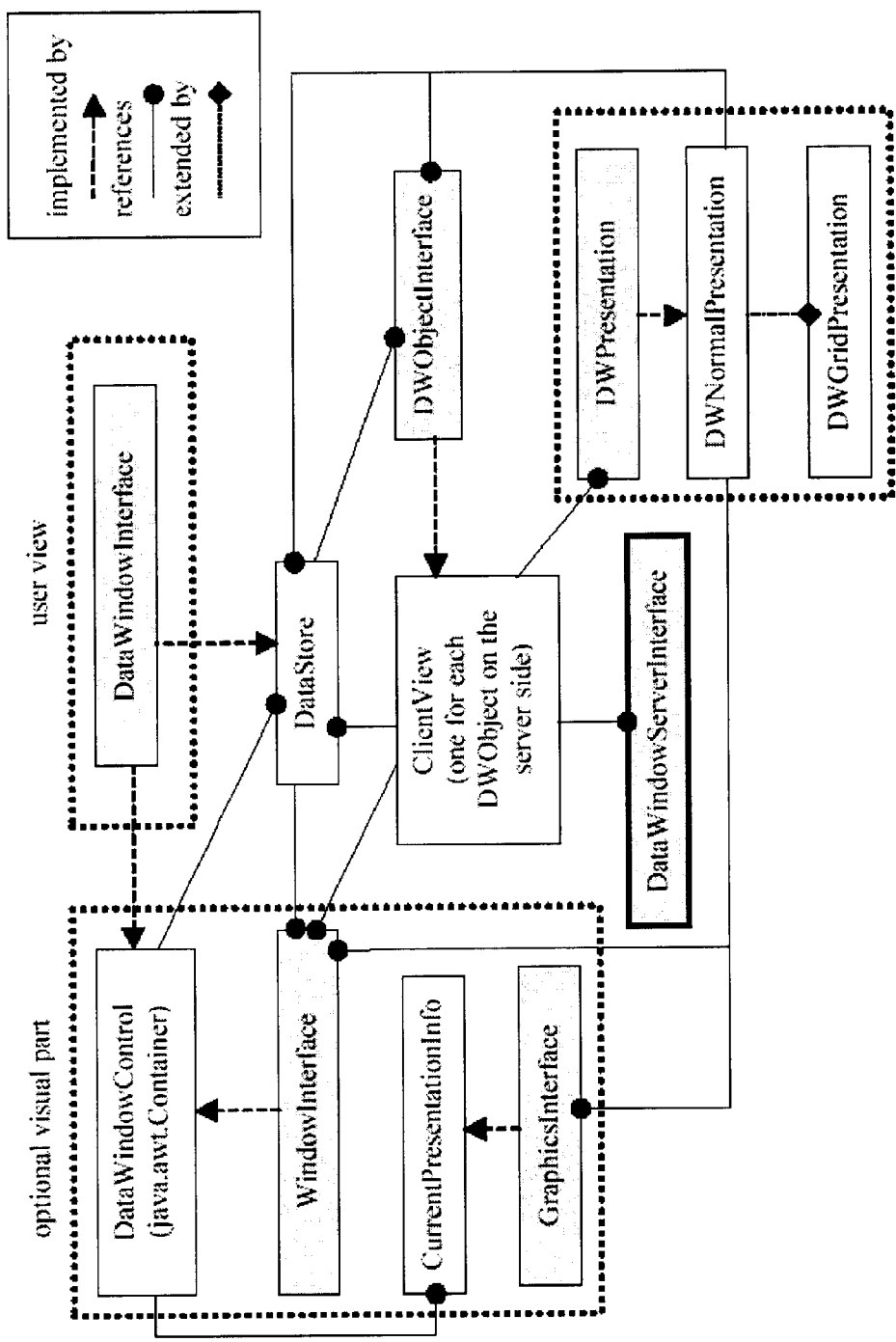
FIGS. 12A–B are block diagrams illustrating client-side and server-side structures for the Java-based data access object of the present invention.

The basic client structure is illustrated in FIG. 12A. There is a strict separation between the client and server pieces of the Java DataWindow. The client talks to the server using a single Java interface, the DataWindowServerInterface. The user deals exclusively with the DataWindowControl or DataStore objects, which implement a common interface with the expected methods (e.g., setSourceFileName, retrieve, and so forth.).

4. Server Structure

Figure 12B:
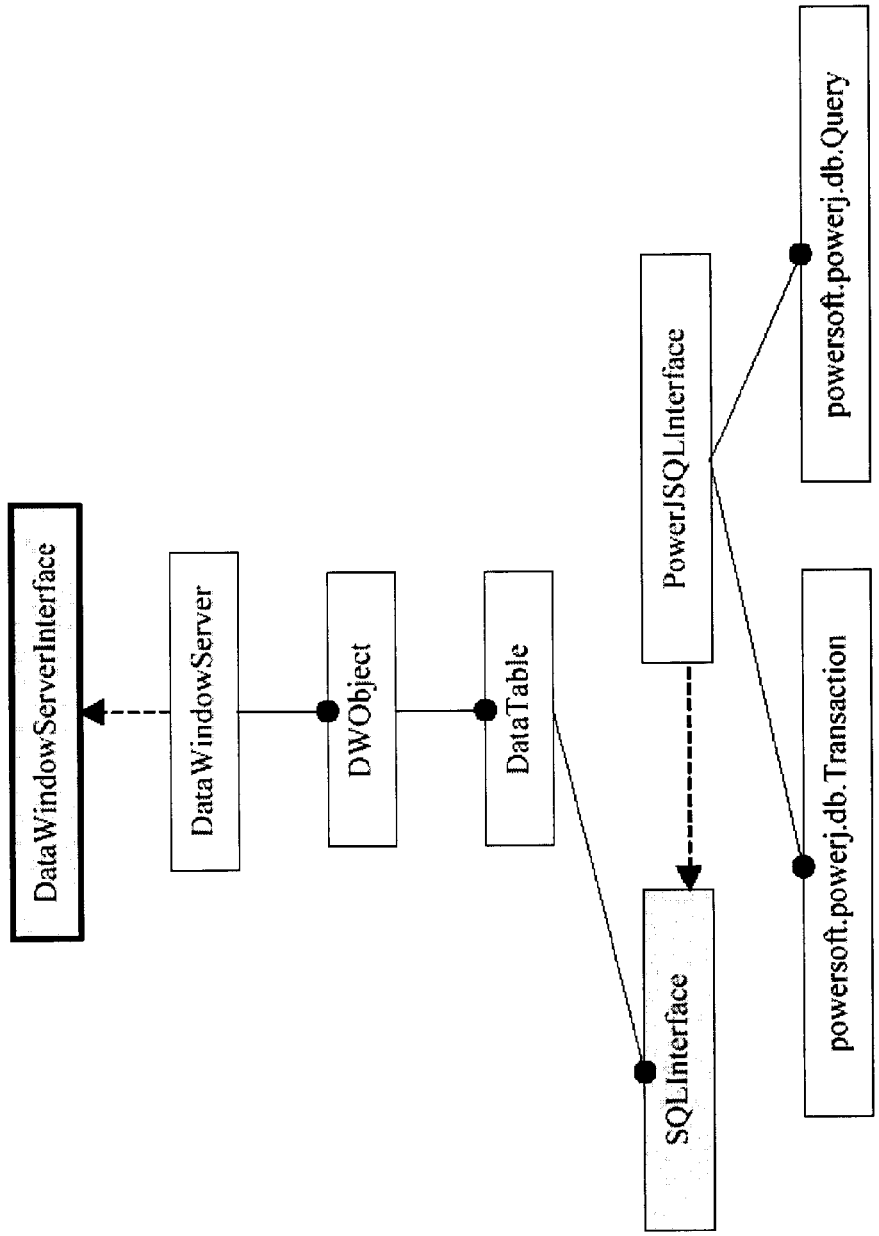

FIG. 12B illustrates the corresponding server-side structure. Note that table data is stored separately from the Query object, which is being used mostly to fetch it, so that the Query object may be the data cache. It already knows how to talk to JDBC and do all the appropriate data conversions, plus it has the filter, delete and primary buffers, and other DataWindow capabilities like sorting and filtering.

5. Methodology for run-time operation of Java DataWindow

In typical usage, the user would have implemented, on the client side, a Web-based application including, for instance, an HTML page having an embedded Java applet. Within that, the application would include an embedded Java DataWindow. On the middle tier, at the level of the application server, a corresponding DataWindow server component (either, Java or C) would be running. The application server would also include a definition for the DataWindow, stored in binary format (.pdb format). The DataWindow definition includes the properties for the DataWindow. This includes, for instance, an SQL statement specifying data to retrieve, typically from a back end database (e.g., relational database) and a format specification describing how the information is to be formatted and/or manipulated for display. The format specification includes, for example, validation rules that are applied during end-user manipulation of the displayed data.

Figure 13:
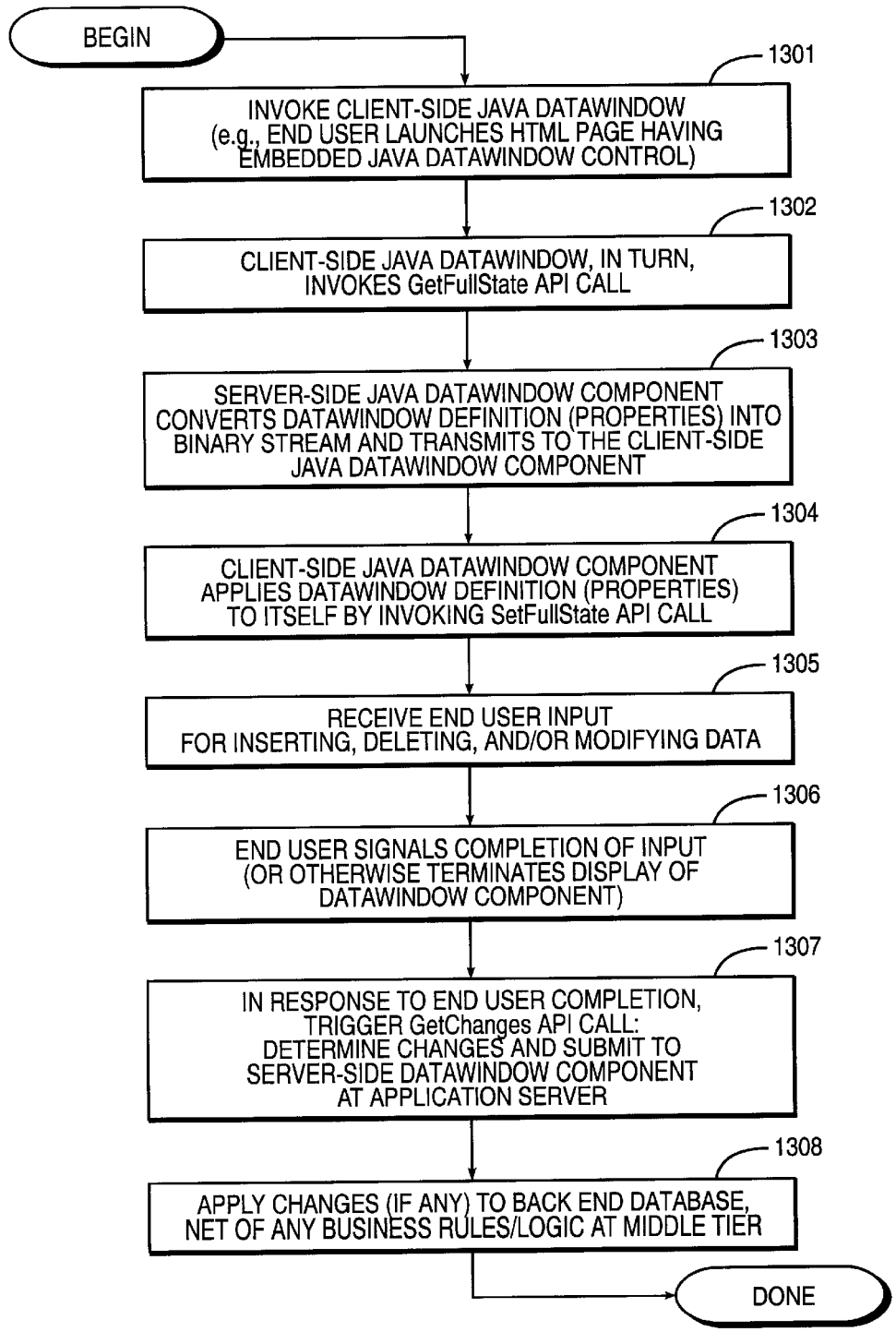
FIG. 13 is a flowchart illustrating a method of the present invention for run-time execution of the Java-based data access object ("Java DataWindow").

Given this context, a method 1300 of the present invention for run-time execution of the Java DataWindow is illustrated in FIG. 13. At the outset, the client-side Java DataWindow is invoked at the client side application (e.g., Java applet), as shown at step 1301. This may occur, for example, upon an end user displaying an HTML page having a Java applet in which the Java DataWindow is embedded. The client-side Java DataWindow begins operation by invoking the corresponding server-side DataWindow component via a GetFullState API call, as shown at step 1302. In response to this call, the DataWindow definition is converted into a binary stream by the server-side DataWindow component at the application server and is then sent to (i.e., streamed to) the client, at step 1303.

Upon receiving the DataWindow definition, the client-side Java DataWindow invokes a SetFullState API call (on itself), at step 1304, for applying the DataWindow definition to itself. This includes invocation of the SQL statement and format specification, whereupon the database information of interest is display at the Java DataWindow in the desired format (e.g., tabular grid). After these properties are applied at the client, the Java DataWindow is ready to (optionally) receive end user input. This step is indicated at step 1305. Typical end user input includes inserting, deleting, and/or modifying information that is displayed at the DataWindow. In the event that the end user has provided input, the end user signals completion of input (or otherwise terminates display of the client-side DataWindow component), such as by selecting an "Okay" screen button, as indicated at step 1306. This action triggers another API call, GetChanges, at step 1307. The purpose of the GetChanges API call is to submit to those user-provided changes to the application server which, in turn, will "commit" those changes (to the back end database). In operation, the GetChanges API call determines internally what has been changed by the end user, since the data was last retrieved. To facilitate this process, the Java DataWindow keeps its own state. Therefore, when GetChanges is invoked, the Java DataWindow generates a stream describing what has changed, in a format suitable for transmission to the application server. Now, the client-side Java DataWindow may invoke SetChanges on the server DataWindow component at the application server. This action leads to application of those changes to the server-side DataWindow component. Finally, the server-side DataWindow component may, in a corresponding manner, proceed to apply those changes to the back end database and/or optionally execute other middle-tier business logic, as indicated at step 1308.

Appended herewith as Appendix A are source code listings providing further description of the present invention. In particular, the source code listings demonstrate invocation of the above-mentioned API, for achieving run-time operation of the Java DataWindow. In order to clarify the source code listings, housekeeping code has been replaced with comments.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

SOURCE CODE APPENDIX A

```
/*
    dwdemo.java
*/
public class dwdemo extends Form1
{
    public static void main(String args[])
    {
        /* Removed for simplification: Code to create the applet */
    }
    public dwdemo()
    {
        super();
    }
}
/*
    __dwdemo__frame.java
*/
public class __dwdemo__frame extends java.awt.Frame implements
java.awt.event.WindowListener
{
    public __dwdemo__frame()
    {
        super();
        addWindowListener( this );
    }
    public void windowClosed( java.awt.event.WindowEvent event )
    {
    }
    public void windowOpened( java.awt.event.WindowEvent event )
    {
    }
```

SOURCE CODE APPENDIX A

```
    public void windowClosing( java.awt.event.WindowEvent event )
    {
        /* Removed for simplification: Code to dispose of the window and
terminate */
    }
    public void windowIconified( java.awt.event.WindowEvent event )
    {
    }
    public void windowActivated( java.awt.event.WindowEvent event )
    {
    }
    public void windowDeiconified( java.awt.event.WindowEvent event )
    {
    }
    public void windowDeactivated( java.awt.event.WindowEvent event )
    {
    }
}
/*
    Form1.java
*/
class Form1 extends javax.swing.JApplet implements
java.awt.event.ActionListener
{
    private boolean Form1_objectCreated(powersoft.powerj.event.EventData
event)
    {
        byte[]       fullState;
        // Load the DataWindow on the server-side, returns back the
        // full DataWindow definition + data
        fullState = javadatawindowbean_1.loadDataWindow( "dw1" );
        // Setup the client-side DataWindow with that returned information
        jdw_1.setFullState( fullState );
        return false;
    }
    private void jcb_1_actionPerformed( java.awt.event.ActionEvent event )
    {
        byte[]       changes = new byte[1][];
        // Get the changes the user made to the client-side DataWindow
        jdw_1.getChanges( changes );
        // Send the message to get those changes applied to the server-side
        javadatawindow_1.update( changes[0] );
    }
    public boolean create() throws java.lang.Exception
    {
        boolean retval = true;
        retval = retval && createTheForm();
        Form1_objectCreated( new powersoft.powerj.event.EventData( this )
);
        return retval;
    }
    private boolean createTheForm() throws java.lang.Exception
    {
    /* Removed for simplification: Code to setup the form's properties */
    /* Removed for simplification: Code to create the JDataWindowControl
*/
    /* Removed for simplification: Code to create the Update button */
    // Setup the initial context
        jctx_1.create( "Form1.jctx_1" );
        jctx_1.setUseJavaxNaming(true);
        jctx_1.setInitialCtxName("com.sybase.ejb.InitialContextFactory");
        jctx_1.setUser( "jagadmin" );
        jctx_1.setPassword( "" );
        jctx_1.setURL( "iiop://localhost:9000" );
    // Connect the initial context
        jctx_1.connect();     // ignore error
    // Instantiate the JavaDataWindowBean
        powersoft.powerj.jaguar.InitialContext jctxt_javadatawindowbean_1 =
powersoft.powerj.jaguar.InitialContext.findByName( "Form1.jctx_1" );
        if ( jctxt_javadatawindowbean_1 != null ) {
            if ( jctxt_javadatawindowbean_1.getUseJavaxNaming() != true ) {
                throw new
powersoft.powerj.jaguar.InitialContextException("EJBs require javax.naming
to be specified.");
            }
            try {
                if ( ! jctxt_javadatawindowbean_1.connect() ) {
```

-continued

SOURCE CODE APPENDIX A

```
                throw new
powersoft.powerj.jaguar.InitialContextException("ORB not connected");
            }
                mydomain.mypackage.JavaDataWindowBeanHome __EJBHOME__TMP =
(mydomain.mypackage.JavaDataWindowBeanHome)jctxt__javadatawindowbean__1.lookup
("JavaDataWindowBean");
                javadatawindowbean__1 = __EJBHOME__TMP.create();
            } catch ( Throwable e ) {
                e.printStackTrace();
            }
        }
        return retval;
    }
    public void start()
    {
    }
    public void stop()
    {
    }
    public synchronized void destroy()
    {
        /* Removed for simplification: Code to destroy the form */
    }
    public void actionPerformed( java.awt.event.ActionEvent event )
    {
        java.lang.Object eventTarget = event.getSource();
        if( eventTarget == jcb__1 ) {
            jcb__1__actionPerformed( event );
        }
    }
    public Form1()
    {
        super();
    }
    protected powersoft.datawindow.JDataWindowControl jdw__1 = null;
    protected javax.swing.JButton jcb__1 = new javax.swing.JButton();
    protected mydomain.mypackage.JavaDataWindowBean javadatawindowbean__1 =
null;
    protected powersoft.powerj.jaguar.InitialContext jctx__1 = new
powersoft.powerj.jaguar.InitialContext();
}
/*
    mydomain-mypackage-JavaDataWindowBean.java
*/
package mydomain.mypackage;
public interface JavaDataWindowBean extends javax.ejb.EJBObject
{
    /**
    * loadDataWindow Method
    */
    public byte[] loadDataWindow( String dataWindowName ) throws
java.rmi.RemoteException;
    /**
    * update Method
    */
    public void update( byte [] changes ) throws java.rmi.RemoteException;
}
/*
    mydomain-mypackage-JavaDataWindowBeanBean.java
*/
package mydomain.mypackage;
public class JavaDataWindowBeanBean extends java.lang.Object implements
javax.ejb.SessionBean
{
    /**
    * loadDataWindow Method
    */
    public byte[] loadDataWindow( String dataWindowName ) throws
java.rmi.RemoteException
    {
        byte[][]      fullState = new byte[1][];
        // Load the DataWindow definition into the server-side DataWindow
        ds__1.setSourceFileName( "alldatawindowdefns.pbd" );
        ds__1.setDataWindowObjectName( dataWindowName );
        // Retrieve the data from the database
        ds__1.retrieve();
        // Get the DataWindow definition and data and send it back to the
```

-continued

SOURCE CODE APPENDIX A

```
client
        ds_1.getFullState( fullState );
        return fullState[0];
    }
    /**
    * update Method
    */
    public void update( byte [] changes ) throws java.rmi.RemoteException
    {
        // Apply the changes made on the client-side DataWindow to the
server-side DataWindow
        ds_1.setChanges( changes );
        // Apply the changes made to the data to the database
        try {
            ds_1.update( true );
        } catch( Exception _e ) {
            System.err.println( "ERROR! Exception occured calling update: " +
_e.getMessage() );
        }
    }
    protected java.lang.Object instantiateBean( java.lang.String beanName )
    {
        java.lang.Object beanObj = null;
        try {
            beanObj =
java.beans.Beans.instantiate(getClass().getClassLoader(), beanName );
        } catch( java.lang.ClassNotFoundException e ) {
            System.err.println( "Unable to find class " + beanName );
        } catch( java.io.IOException e ) {
            System.err.println( "I/O exception while instantiating class " +
beanName );
        } catch( java.lang.SecurityException e ) {
//          System.err.println( "Security exception while instantiating
class " + beanName );
        } catch( java.lang.Throwable e ) {
//          System.err.println( "Exception while instantiating class " +
beanName );
        }
        return beanObj;
    }
    protected boolean create() throws java.lang.Exception
    {
        // Connection source: JDBC Driver (direct)
        transaction_1.setTraceToLog( true );
        transaction_1.setRegisterName( true );
        transaction_1.setName( "JavaDataWindowBeanBean.transaction_1" );
        transaction_1.registerDriver( "com.sybase.jdbc.SybDriver" );
        transaction_1.setDriverName( "com.sybase.jdbc.SybDriver" );
        transaction_1.setConnectionSource(
transaction_1.createJDBCConnectionSource( "com.sybase.jdbc.SybDriver" ) );
        transaction_1.setUserID( "" );
        transaction_1.setPassword( "" );
        transaction_1.setUseInitialSettings( true );
        transaction_1.setLoginTimeout( 0 );
        transaction_1.setOwner( this );
        transaction_1.setRestoreInitialSettings( false );
        ds_1 = (powersoft.datawindow.DataStore)instantiateBean(
"powersoft.datawindow.DataStore" );
        try {
            ds_1.setDataWindowObjectName( "" );
            ds_1.setTraceToLog( false );
            ds_1.setUserID( "" );
            ds_1.setHorizontalPrinterMargin( 36 );
            ds_1.setVerticalPrinterMargin( 36 );
            ds_1.setPassword( "" );
            ds_1.setConnectionSource( 1 );
            ds_1.setDriverName( "" );
            ds_1.setTransactionName( "JavaDataWindowBeanBean.transaction_1"
);
            ds_1.setSourceFileName( "" );
        }
        catch( java.lang.Exception e_ds_1 ) {
            e_ds_1.printStackTrace();
        }
        if( !transaction_1.connect() ){
            transaction_1.log("autoconnect failed");
        }
```

-continued

SOURCE CODE APPENDIX A

```
        return true;
    }
    public JavaDataWindowBeanBean()
    {   // EJB constructors don't have a server context.
    }
    private void unhandledEvent( String listenerName, String methodName,
java.lang.Object event )
    {
    }
    // method for interface javax.ejb.SessionBean
    public void setSessionContext( javax.ejb.SessionContext parm0 ) throws
java.rmi.RemoteException
    {
        this._sessionContext = parm0;
    }
    // method for interface javax.ejb.SessionBean
    public void ejbRemove() throws java.rmi.RemoteException
    {
    }
    // method for interface javax.ejb.SessionBean
    public void ejbActivate() throws java.rmi.RemoteException
    {
    }
    // method for interface javax.ejb.SessionBean
    public void ejbPassivate() throws java.rmi.RemoteException
    {
    }
    /**
    * Session Context of this EJB.
    * Set in 'setSessionContext()' before any 'ejbCreate()' is executed.
    */
    private javax.ejb.SessionContext _sessionContext;
    /**
    * ejbCreate Method
    */
    public void ejbCreate() throws java.rmi.RemoteException,
javax.ejb.CreateException
    {
        try {
            create();   // This 'create()' is used for internal
initialization.
        }
        catch( java.lang.Exception _e ) {
            System.err.println( _e.toString() + "" + _e.getMessage() );
        }
    }
    protected powersoft.datawindow.DataStore ds_1 = null;
    protected powersoft.powerj.db.java_sql.Transaction transaction_1 = new
powersoft.powerj.db.java_sql.Transaction();
}
/*
    mydomain.mypackage.JavaDataWindowBeanHome.java
*/
package mydomain.mypackage;
public interface JavaDataWindowBeanHome extends javax.ejb.EJBHome
{
    /**
    * create Method
    */
    public JavaDataWindowBean create() throws java.rmi.RemoteException,
javax.ejb.CreateException;
}
```

What is claimed is:

1. A method for providing object-based data access in a Web environment supporting Java, the method comprising:

receiving at a Web browser an end user request for displaying a Web page, thereby invoking a client-side Java-based data access component that is embedded therein;

in response to invocation of the client-side component, invoking a corresponding server-side data access component for retrieving definition information for runtime operation of the client-side component, said definition information including a database query specifying retrieval of information from a database and including a format specification specifying presentation of the information retrieved from the database to the end user; and applying the definition information, upon receipt, to the client-side component, whereupon information of interest is retrieved from the database and is presented to the end user by the client-side component in accordance with the format specification.

2. The method of claim 1, wherein said definition information is converted into a binary stream by the server-side component for transmission to the client-side component.

3. The method of claim 1, wherein said server-side component resides on an application server.

4. The method of claim 1, wherein said database query comprises an SQL statement specifying retrieval of information of interest from the database.

5. The method of claim 1, wherein said format specification defines a presentation format for displaying information at the client-side component.

6. The method of claim 1, wherein said Web page comprises a hypertext markup language (HTML) page.

7. The method of claim 1, wherein said client-side component is embedded in a Java applet.

8. The method of claim 1, further comprising:

receiving user input for interacting with said client-side component.

9. The method of claim 8, wherein said user input includes user input for manipulating database information presented by the client-side component.

10. The method of claim 9, wherein said manipulating step includes inserting, deleting, and updating database information presented by the client-side component.

11. The method of claim 8, wherein said client-side component applies validation rules defined by said definition information for validating said user input.

12. The method of claim 1, wherein said information of interest comprises database rows retrieved from one or more database tables residing on a server.

13. The method of claim 1, wherein client-side component displays a graphical user interface, in accordance with said format specification.

14. The method of claim 1, further comprising:

receiving user input for changing database information presented by the client-side component;

generating a stream describing what has changed and transmitting it to the server-side components;

at the server-side component, applying any described changes to the database.

15. The method of claim 14, wherein said server side component first applies business rules to any described changes before applying said changes to the database.

16. The method of claim 1, wherein said format specification specifies whether information retrieved from a database is modifiable.

17. The method of claim 1, wherein said format specification may be customized to display information to the user in different presentation styles.

18. The method of claim 1, wherein said server-side data access component retrieves information from more than one database.

19. The method of claim 1, wherein said server-side data access component retrieves information from multiple data sources, which may include database and nondatabase sources.

20. The method of claim 1, wherein said Java-based data access component comprises a Java programming language JavaBeans-based component.

21. The method of claim 20, wherein said Java-based data access component comprises a native component.

22. The method of claim 21, wherein said Java-based data access component comprises as a Java programming language lightweight Swing-based component.

23. The method of claim 1, wherein said format specification can be modified by a user.

24. A system providing on-line interaction with databases, the system comprising:

a client-side Java based data access component that receives at a browser an end user request for information, wherein said component invokes a server-side data access component and, upon receipt of information from the server-side component, presents the information received for display in the browser in a format specified by the server-side component;

a server-side data access component for retrieving definition information for run-time operation of the client-side component, said definition information including a database query specifying retrieval of information from a database and a format specification specifying presentation of the information received from the database to the end user; and at least one database in which information is stored.

25. The system of claim 24, wherein said server-side component converts the definition information into a binary stream for transmission to the client-side component.

26. The system of claim 24, wherein said server-side component resides on an application server.

27. The system of claim 24, wherein said database query comprises an SQL statement specifying retrieval of information from a database.

28. The system of claim 24, wherein said client-side component presents information comprising a hypertext markup language (HTML) page.

29. The system of claim 24, wherein said client-side component is embedded in a Java applet.

30. The system of claim 24, wherein a user may manipulate information presented by the client-side component.

31. The system of claim 24, wherein a user may perform insert, delete, and update operations on database information presented by the client-side component.

32. The system of claim 24, wherein said client-side component applies validation rules defined by said definition information for validating user input.

33. The system of claim 24, wherein said client-side component receives user input for changing database information, said client-side component generates a stream describing what has changed and transmitting it to the server-side component; and said server-side component applies any described changes to one or more databases.

34. The system of claim 33, wherein said server-side component applies business rules before applying said described changes to said databases.

* * * * *